(12) United States Patent
Callahan et al.

(10) Patent No.: US 10,982,797 B1
(45) Date of Patent: Apr. 20, 2021

(54) MULTIPLE TUBING ANNULI PIPELINE SYSTEMS AND METHODS

(71) Applicant: Trinity Bay Equipment Holdings, LLC, Houston, TX (US)

(72) Inventors: Kaci Michelle Callahan, Houston, TX (US); Juan Alfredo Erni, Fulshear, TX (US); Kirk Spencer Francis, Richmond, TX (US)

(73) Assignee: Trinity Bay Equipment Holdings, LLC, Houston, TX (US)

(*) Notice: Subject to any disclaimer, the term of this patent is extended or adjusted under 35 U.S.C. 154(b) by 0 days.

(21) Appl. No.: 16/931,041

(22) Filed: Jul. 16, 2020

(51) Int. Cl.
*F16L 11/08* (2006.01)
*F16L 11/12* (2006.01)
*F16L 11/04* (2006.01)

(52) U.S. Cl.
CPC ............ *F16L 11/082* (2013.01); *F16L 11/12* (2013.01); *F16L 2011/047* (2013.01)

(58) Field of Classification Search
CPC ........ F16L 11/082; F16L 11/083; F16L 11/12; F16L 2011/047
USPC ....... 138/129, 134, 135, 141, 137, 143, 154, 138/150, 127
See application file for complete search history.

(56) References Cited

U.S. PATENT DOCUMENTS

| 6,446,672 | B1 | 9/2002 | Kalman et al. | |
|---|---|---|---|---|
| 8,967,205 | B2 * | 3/2015 | Kalman | F16L 11/083 138/134 |
| 9,217,526 | B2 | 12/2015 | Eccleston | |
| 2003/0056845 | A1 * | 3/2003 | Fraser | F16L 11/22 138/127 |
| 2008/0149209 | A1 * | 6/2008 | Felix-Henry | F16L 11/083 138/127 |

(Continued)

FOREIGN PATENT DOCUMENTS

WO 2011026801 A1 3/2011

OTHER PUBLICATIONS

Kalman et al., OTC 23931 Qualification of Flexible Fiber-Reinforced Pipe (FFRP) for Ultra-deepwater Applications, Offshore Technology Conference 2013, May 6-9, 2013.

(Continued)

*Primary Examiner* — Patrick F Brinson
(74) *Attorney, Agent, or Firm* — Conrad J. Hsu

(57) ABSTRACT

Techniques for implementing a pipe segment that includes a tubing inner barrier layer that defines a pipe bore through the pipe segment, a venting tubing annulus implemented around the tubing inner barrier layer, in which the venting tubing annulus includes a first solid material implemented to define a venting fluid conduit, a tubing intermediate barrier layer implemented around the venting tubing annulus, a reinforcement tubing annulus implemented around the tubing intermediate barrier layer, and a tubing outer barrier layer implemented around the reinforcement tubing annulus. The reinforcement tubing annulus includes a second solid material that is different from the first solid material and is implemented to define a reinforcement fluid conduit. Additionally, the venting fluid conduit facilitates venting fluid that permeates from the pipe bore through the tubing inner barrier layer out from the pipe segment before the fluid contacts the second solid material in the reinforcement tubing annulus.

16 Claims, 8 Drawing Sheets

(56) References Cited

U.S. PATENT DOCUMENTS

| | | | |
|---|---|---|---|
| 2008/0210329 A1* | 9/2008 | Quigley | F16L 11/12 138/127 |
| 2010/0068986 A1* | 3/2010 | Eccleston | G01M 3/283 454/339 |
| 2010/0084035 A1* | 4/2010 | Binet | F16L 11/083 138/104 |
| 2010/0101676 A1* | 4/2010 | Quigley | F16L 9/19 138/137 |
| 2011/0226374 A1* | 9/2011 | Kalman | F16L 11/083 138/129 |
| 2016/0003382 A1* | 1/2016 | Glejbol | F16L 11/20 138/134 |

OTHER PUBLICATIONS https://www.soluforce.com/soluforce/products/gastight.php.

* cited by examiner

MULTIPLE TUBING ANNULI PIPELINE SYSTEMS AND METHODS

BACKGROUND

The present disclosure generally relates to pipeline systems and, more particularly, to a pipe segment that may be deployed in a pipeline system.

Pipeline systems are often implemented and/or operated to facilitate transporting (e.g., conveying) fluid, such as liquid and/or gas, from a fluid source to a fluid destination. For example, a pipeline system may be used to transport one or more hydrocarbons, such as crude oil, petroleum, natural gas, or any combination thereof. Additionally or alternatively, a pipeline system may be used to transport one or more other types of fluid, such as produced water, fresh water, fracturing fluid, flowback fluid, carbon dioxide, or any combination thereof.

To facilitate transporting fluid, a pipeline system may include one or more pipe segments, for example, in addition to one or more pipe (e.g., midline and/or end) fittings (e.g., connectors) used to couple a pipe segment to another pipe segment, to a fluid source, and/or to a fluid destination. Generally, a pipe segment includes tubing, which defines (e.g., encloses) a pipe bore that provides a primary fluid conveyance (e.g., flow) path through the pipe segment. More specifically, the tubing of a pipe segment may be implemented to facilitate isolating (e.g., insulating) fluid being conveyed within its pipe bore from environmental conditions external to the pipe segment, for example, to reduce the likelihood of the conveyed (e.g., bore) fluid being lost to the external environmental conditions and/or the external environmental conditions contaminating the conveyed fluid (e.g., clean and/or potable water).

To facilitate improving fluid isolation, in some instances, the tubing of a pipe segment may be implemented with multiple layers. For example, the tubing of a pipe segment may include an inner (e.g., innermost) barrier layer (e.g., liner or sheath) and an outer (e.g., outermost) barrier layer (e.g., shield or sheath) that each run (e.g., span) the length of the pipe segment. To facilitate improving its tensile strength and/or its hoop strength, the tubing of the pipe segment may additionally include one or more reinforcement layers, which are implemented between the inner barrier layer and the outer barrier layer using a solid material that has a higher tensile strength and/or a higher linear elasticity modulus (e.g., stiffness) than the solid material used to implement the inner barrier layer and/or the outer barrier layer. However, even when implemented as a continuous solid layer, some amount of fluid (e.g., gas and/or liquid) may nevertheless permeate from a pipe bore of a pipe segment through its tubing inner barrier layer and/or from environmental conditions external to the pipe segment through its tubing outer barrier layer and contact material in one of more of its tubing reinforcement layers, which, at least in some instances, may potentially affect (e.g., reduce) tensile strength and/or hoop strength of the pipe segment, for example, due to the permeated fluid corroding the solid material in the one or more tubing reinforcement layers of the pipe segment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a pipe segment includes a tubing inner barrier layer that defines a pipe bore through the pipe segment, a venting tubing annulus implemented around the tubing inner barrier layer, in which the venting tubing annulus includes a first solid material implemented to define a venting fluid conduit, a tubing intermediate barrier layer implemented around the venting tubing annulus, a reinforcement tubing annulus implemented around the tubing intermediate barrier layer, and a tubing outer barrier layer implemented around the reinforcement tubing annulus of the pipe segment. The reinforcement tubing annulus includes a second solid material that is different from the first solid material and is implemented to define a reinforcement fluid conduit. Additionally, the venting fluid conduit implemented in the venting tubing annulus facilitates venting fluid that permeates from the pipe bore through the tubing inner barrier layer out from the pipe segment before the fluid contacts the second solid material in the reinforcement tubing annulus.

In another embodiment, a method of implementing tubing of a pipe segment includes implementing an inner barrier layer of the tubing to define a pipe bore through the pipe segment, implementing a venting tubing annulus around the inner barrier layer at least in part by implementing a venting layer of the tubing using a first solid material to facilitate defining a venting fluid conduit that facilitates venting fluid that permeates through the inner barrier layer of the tubing out from the tubing of the pipe segment, implementing an intermediate barrier layer of the tubing around the venting tubing annulus, implementing a reinforcement tubing annulus around the intermediate barrier layer of the tubing at least in part by implementing a reinforcement layer of the tubing using a second solid material that is different from the first solid material to facilitate defining a reinforcement fluid conduit within the tubing of the pipe segment, and implementing an outer barrier layer of the tubing around the reinforcement tubing annulus.

In another embodiment, pipe segment tubing includes an inner barrier layer that defines a pipe bore, an outer barrier layer implemented around the inner barrier layer of the pipe segment tubing, a reinforcement layer implemented between the inner barrier layer and the outer barrier layer of the pipe segment tubing, in which the reinforcement layer defines a reinforcement fluid conduit, a venting layer implemented between the inner barrier layer and the outer barrier layer of the pipe segment tubing, in which the reinforcement layer defines venting fluid conduit that facilitate venting fluid that permeates into the pipe segment tubing out from the pipe segment tubing before the fluid contacts solid material in the reinforcement layer of the pipe segment tubing, and an intermediate barrier layer implemented between the reinforcement layer and the venting layer of the pipe segment tubing.

DETAILED DESCRIPTION

Figure 1:
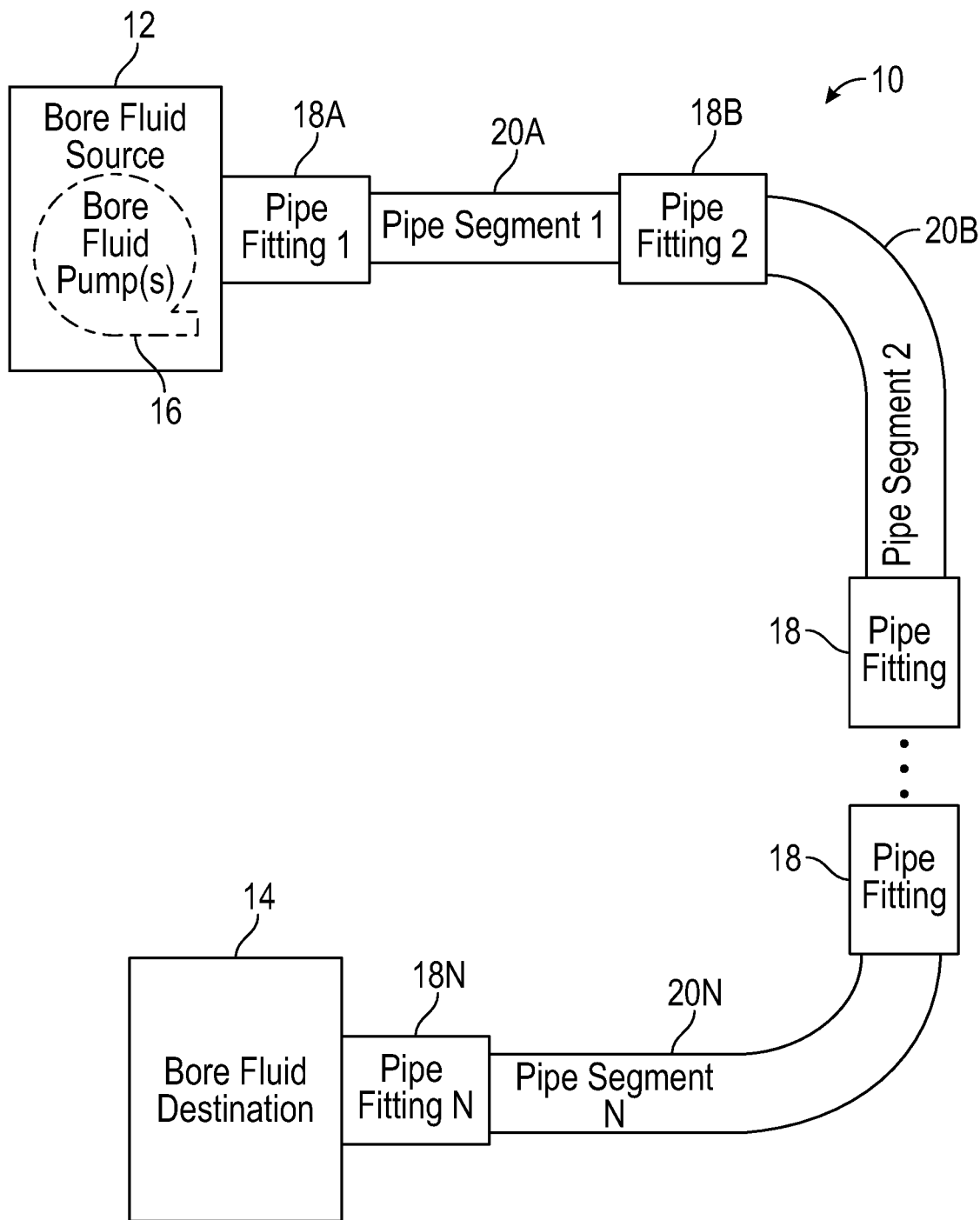
FIG. 1 is a block diagram of an example of a pipeline system including pipe segments and pipe fittings (e.g., connectors), in accordance with an embodiment of the present disclosure.

One or more specific embodiments of the present disclosure will be described below with reference to the figures. As used herein, the term "coupled" or "coupled to" may indicate establishing either a direct or indirect connection and, thus, is not limited to either unless expressly referenced as such. The term "set" may refer to one or more items. Wherever possible, like or identical reference numerals are used in the figures to identify common or the same features. The figures are not necessarily to scale. In particular, certain features and/or certain views of the figures may be shown exaggerated in scale for purposes of clarification.

The present disclosure generally relates to pipeline systems that may be implemented and/or operated to transport (e.g., convey) fluid, such as liquid and/or gas, from a fluid source to a fluid destination. Generally, a pipeline system may include pipe fittings (e.g., connectors), such as a midline pipe fitting and/or a pipe end fitting, and one or more pipe segments, which each includes tubing that defines (e.g., encloses) a corresponding pipe bore. More specifically, a pipe segment may generally be secured and sealed in one or more pipe fittings to facilitate fluidly coupling the pipe segment to another pipe segment, a fluid source, and/or a fluid destination. Merely as an illustrative non-limiting example, a pipeline system may include a first pipe end fitting secured to a first pipe segment to facilitate fluidly coupling the first pipe segment to the fluid source, a midline pipe fitting secured between the first pipe segment and a second pipe segment to facilitate fluidly coupling the first pipe segment to the second pipe segment, and a second pipe end fitting secured to the second pipe segment to facilitate fluidly coupling the second pipe segment to the fluid destination.

In any case, a pipe segment generally includes tubing, which defines (e.g., encloses) a pipe bore that provides a primary fluid conveyance (e.g., flow) path through the pipe segment. More specifically, the tubing of a pipe segment may be implemented to facilitate isolating environmental conditions external to the pipe segment from conditions within its pipe bore and, thus, fluid that flows therethrough. In particular, the tubing of a pipe segment may primarily be implemented to block fluid flow directly between the pipe bore of the pipe segment and its external environmental conditions, for example, in addition to providing thermal, pressure, and/or electrical isolation (e.g., insulation).

To facilitate improving fluid isolation, in some instances, the tubing of a pipe segment may be implemented with multiple layers. For example, the tubing of a pipe segment may include an inner (e.g., innermost) barrier layer (e.g., liner or sheath) and an outer (e.g., outermost) barrier layer (e.g., shield or sheath) that each run (e.g., span) the length of the pipe segment. To facilitate blocking fluid flow directly therethrough, the inner barrier layer and the outer barrier layer may each be a continuous layer of solid material, such as plastic, that runs the length of the pipe segment.

To facilitate improving its tensile strength and/or its hoop strength, in some instances, the tubing of a pipe segment may additionally include one or more reinforcement layers implemented between its inner barrier layer and its outer barrier layer. In particular, a reinforcement layer of the pipe segment tubing may be implemented with a solid material that has a higher tensile strength and/or a higher linear elasticity modulus (e.g., stiffness) as compared to a solid material used to implement the inner barrier layer and/or the outer barrier layer of the pipe segment tubing. For example, the reinforcement layer of the pipe segment tubing may be implemented using metal, such as steel, while the inner barrier layer and the outer barrier layer of the pipe segment tubing are implemented using plastic, such as high-density polyethylene (HDPE).

Nevertheless, in some instances, a reinforcement layer of pipe segment tubing may include solid material as well as one or more openings devoid of solid material, for example, to facilitate implementing a flexible pipe that may be spooled on a reel and/or in a coil. Merely as an illustrative non-limiting example, the reinforcement layer of the pipe segment tubing may include solid material helically wrapped (e.g., wound) on the inner barrier layer of the pipe segment tubing such that gaps are left between adjacent wraps of the solid material to facilitate defining a helically-shaped opening that runs along the pipe segment tubing. In other words, in such instances, the reinforcement layer may have one or more gaps in which the solid material is not implemented and, thus, may be included in a reinforcement tubing annulus of the pipe segment tubing that is implemented between the inner barrier layer and the outer barrier layer of the pipe segment tubing.

Even when implemented using a continuous layer of solid material, at least in some instances, some amount of fluid (e.g., gas and/or liquid) may nevertheless permeate (e.g., pass) through the inner barrier layer and/or outer barrier layer of the tubing of a pipe segment. In other words, at least in some instances, some amount of fluid may permeate from the pipe bore of the pipe segment through the inner barrier layer of the tubing and/or from environmental conditions external to the pipe segment through the outer barrier layer of the tubing into the reinforcement tubing annulus of the pipe segment and, thus, contact the solid material used to implement one or more reinforcement layers included in the reinforcement tubing annulus of the pipe segment. Moreover, at least in some instance, fluid that permeates through the inner barrier layer and/or the outer barrier layer, such as hydrogen sulfide ($H_2S$) and/or carbon dioxide ($CO_2$), may potentially corrode the solid material in one or more reinforcement layers of the pipe segment and, thus, potentially weaken the tensile strength and/or the hoop strength of the pipe segment.

Accordingly, to facilitate improving pipe segment tensile strength and/or hoop strength, the present disclosure describes techniques for implementing a pipe segment to facilitate reducing permeation of fluid (e.g., potentially corrosive fluid) into a reinforcement tubing annulus of the pipe segment, which is implemented between an inner barrier layer and an outer barrier layer of the tubing of the pipe segment. As will be described in more detail below, to facilitate reducing fluid permeation into the reinforcement tubing annulus, the pipe segment may additionally include one or more intermediate barrier layer, which are each implemented between the inner barrier layer and the outer barrier layer of the pipe segment tubing. In particular, as will be described in more detail below, an intermediate barrier layer of the pipe segment may be implemented in the tubing of the pipe segment to facilitate separating the reinforcement tubing annulus in the pipe segment tubing from a corresponding venting tubing annulus in the pipe segment tubing.

For example, in some embodiments, the tubing of a pipe segment may be implemented such that a venting tubing annulus of the pipe segment tubing is implemented internal to an intermediate barrier layer of the pipe segment tubing while a reinforcement tubing annulus of the pipe segment tubing is implemented external to the intermediate barrier layer. In other words, in such embodiments, the venting tubing annulus may facilitate venting fluid (e.g., potentially corrosive fluid) that permeates through the inner barrier layer of the pipe segment tubing before it reaches the reinforcement tubing annulus of the pipe segment tubing, for example, at least in part by routing the fluid to a vent port implemented in a pipe fitting that is fluidly coupled to the venting tubing annulus. Additionally or alternatively, in some embodiments, the tubing of a pipe segment may be implemented such that a venting tubing annulus of the pipe segment tubing is implemented external to an intermediate barrier layer of the pipe segment tubing while a reinforcement tubing annulus of the pipe segment tubing is implemented internal to the intermediate barrier layer. In other words, in such embodiments, the venting tubing annulus may facilitate venting fluid (e.g., potentially corrosive fluid and/or external environmental fluid) that permeates through the outer barrier layer of the pipe segment tubing before it reaches the reinforcement tubing annulus and/or a pipe bore of the pipe segment, for example, at least in part by routing the fluid to a vent port implemented in a pipe fitting that is fluidly coupled to the venting tubing annulus.

To facilitate venting fluid, the venting tubing annulus of a pipe segment may include one or more venting layers, for example, implemented around the inner barrier layer or an intermediate barrier layer of the tubing of the pipe segment to define one or more venting fluid conduits. In particular, in some embodiments, a venting layer of the pipe segment tubing may be implemented at least in part by helically wrapping solid permeation resistant material, such as a polymer (e.g., plastic) and/or aluminum, on a barrier layer of the pipe segment tubing such that gaps are left between adjacent wraps of the solid permeation resistant material. Additionally or alternatively, to facilitate improving tensile strength and/or hoop strength of the pipe segment, the solid material used to implement the venting layer may be aluminum and/or another material that is less susceptible to interaction (e.g., corrosion) with fluid, such as hydrogen sulfide ($H_2S$), that permeates through the inner barrier layer and/or the outer barrier layer of the pipe segment as compared to the solid material (e.g., steel) that is used to implement a reinforcement layer of the pipe segment.

In some embodiments, an intermediate barrier layer or an outer barrier layer of the tubing of a pipe segment may then be disposed directly over a venting layer included in the venting tubing annulus of the pipe segment. To facilitate reducing permeation therethrough, similar to the inner barrier layer and the outer barrier layer, the intermediate barrier layer may be implemented as a continuous layer of solid material. In fact, in some embodiments, an intermediate barrier layer of pipe segment tubing may be implemented using the same type of solid material as the inner barrier layer and/or the outer barrier layer of the pipe segment tubing. However, in other embodiments, an intermediate barrier layer of the tubing of a pipe segment may be implemented using a different type of solid material as compared to the inner barrier layer and/or the outer barrier layer of the pipe segment tubing. For example, the inner barrier layer and/or the outer barrier layer of the pipe segment tubing may be implemented using high-density polyethylene (HDPE) while an intermediate barrier layer of the pipe segment tubing is implemented using a different type of solid material that is less susceptible to fluid permeation as compared to high-density polyethylene.

Additionally, in some embodiments, an intermediate barrier layer of pipe segment tubing may be implemented at least in part by extruding (e.g., melting and pulling) the intermediate barrier layer around a venting tubing annulus of the pipe segment tubing. However, at least in some instances, extruding the intermediate barrier layer directly around a venting layer included in the venting tubing annulus of the pipe segment tubing may result in the intermediate barrier layer at least partially falling into a venting fluid conduit defined in the venting layer of the pipe segment tubing. In other words, in such instances, the intermediate barrier layer may at least partially block the venting fluid conduit, which, at least in some instances, may increase the fluid pressure within the venting tubing annulus and, thus, reduce the likelihood that fluid (e.g., potentially corrosive fluid) is vented out from within the pipe segment tubing before permeating through the intermediate barrier layer into the reinforcement tubing annulus of the pipe segment tubing.

Furthermore, in some embodiments, the outer barrier layer of pipe segment tubing may be implemented at least in part by extruding (e.g., melting and pulling) the outer barrier layer around a venting tubing annulus of the pipe segment tubing. However, at least in some instances, extruding the outer barrier layer directly around a venting layer included in the venting tubing annulus of the pipe segment tubing may result in the outer barrier layer at least partially falling into a venting fluid conduit defined in the venting layer of the pipe segment tubing. In other words, in such instances, the outer barrier layer may at least partially block the venting fluid conduit, which, at least in some instances, may increase the fluid pressure within the venting tubing annulus and, thus, reduce the likelihood that fluid (e.g., potentially corrosive fluid) is vented out from within the pipe segment tubing before permeating into the reinforcement tubing annulus of the pipe segment tubing.

To facilitate reducing the likelihood of the outer barrier layer of pipe segment tubing inadvertently blocking a venting fluid conduit defined in a venting layer of the pipe segment tubing, in some embodiments, the pipe segment tubing may additionally include barrier tape implemented between a venting tubing annulus and its outer barrier layer. Similarly, to facilitate reducing the likelihood of an intermediate barrier layer of pipe segment tubing inadvertently blocking a venting fluid conduit defined in a venting layer of the pipe segment tubing, in some embodiments, the pipe segment tubing may additionally include barrier tape implemented between a venting tubing annulus and an intermediate barrier layer. In any case, barrier tape may generally include an adhesive layer and a barrier layer.

In particular, in some embodiments, the adhesive layer of barrier tape may be heat activated. Furthermore, in some embodiments, the barrier layer of barrier tape may be implemented using a solid material, such as a polymer and/or aluminum, that is less permeable to fluid (e.g., potentially corrosive fluid) as compared to the adhesive layer of the barrier tape and one or more barrier layers of the pipe segment tubing. Additionally or alternatively, to facilitate improving tensile strength and/or hoop strength of the pipe segment tubing, the solid material used to implement the barrier layer of the barrier tape may be aluminum and/or another material that is less susceptible to interaction (e.g., corrosion) with fluid, such as hydrogen sulfide ($H_2S$), that permeates through the inner barrier layer and/or the outer barrier layer of the pipe segment tubing as compared to the solid material (e.g., steel) that is used to implement a reinforcement layer of the pipe segment tubing. In fact, in some embodiments, the barrier layer of the barrier tape may be implemented using the same type of solid material as the venting layer of the pipe segment tubing.

In any case, in some embodiments, barrier tape may be implemented in a pipe segment using a first orientation in which its adhesive layer is oriented inwardly (e.g., facing pipe bore) and its barrier layer is oriented outwardly (e.g., facing external environmental conditions). However, as described above, in some embodiments, the adhesive layer of the barrier tape may be implemented using solid material that is more permeable to fluid (e.g., potentially corrosive fluid) than the barrier layer of the barrier tape. In other words, when the barrier tape is implemented using the first orientation, in some instances, fluid that permeates through the inner barrier layer of the tubing of the pipe segment may permeate through the adhesive layer of the barrier tape before being blocked by the barrier layer of the barrier tape.

In fact, at least in some instance, implementing barrier tape in a pipe segment using the first orientation may result in fluid that permeates through its inner barrier layer being present between the adhesive layer and the barrier layer of the barrier tape when a pipeline system in which the pipe segment is deployed is depressurized. Generally, during operation, a pipeline system is pressurized to facilitate producing a fluid flow through the pipe bore of one or more pipe segments deployed therein. On the other hand, operation of the pipeline system may generally be stopped at least in part by depressurizing the pipeline system. However, depressurizing the pipeline system may cause fluid present between the adhesive layer and the barrier layer of the barrier tape to expand, which, at least in some instances, may result in the adhesive layer and the barrier layer of the barrier tape separating from one another and, thus, potentially produce a fault, such as a hole, in the barrier tape.

To facilitate reducing the likelihood of faults occurring in barrier tape in a pipe segment, in some embodiments, barrier tape may additionally or alternatively be implemented in the pipe segment using a second (e.g., different and/or opposite) orientation in which its adhesive layer is oriented outwardly (e.g., facing external environmental conditions) and its barrier layer is oriented inwardly (e.g., facing pipe bore). In particular, in such embodiments, the barrier layer of the barrier tape may block fluid (e.g., potentially corrosive fluid) that permeates through the inner barrier layer of the tubing of the pipe segment before it reaches the adhesive layer of the barrier tape. In other words, at least in some instances, implementing the barrier tape in the pipe segment using the second orientation may facilitate reducing the amount of fluid that is present between the barrier layer and the adhesive layer of the barrier tape when the pipeline system is depressurized and, thus, the likelihood that the depressurization produces a fault, such as a hole, in the barrier tape of the pipe segment. In this manner, as will be described in more detail below, the techniques described in the present disclosure may facilitate improving the tensile strength and/or the hoop strength of one or more pipe segments deployed in a pipeline system.

To help illustrate, an example of a pipeline system 10 is shown in FIG. 1. As in the depicted example, the pipeline system 10 may be coupled between a bore fluid source 12 and a bore fluid destination 14. Merely as an illustrative non-limiting example, the bore fluid source 12 may be a production well and the bore fluid destination 14 may be a fluid storage tank. In other instances, the bore fluid source 12 may be a first (e.g., lease facility) storage tank and the bore fluid destination 14 may be a second (e.g., refinery) storage tank.

In any case, the pipeline system 10 may generally be implemented and/or operated to facilitate transporting (e.g., conveying) fluid, such as gas and/or liquid, from the bore fluid source 12 to the bore fluid destination 14. In fact, in some embodiments, the pipeline system 10 may be used in many applications, including without limitation, both onshore and offshore oil and gas applications. For example, in such embodiments, the pipeline system 10 may be used to transport one or more hydrocarbons, such as crude oil, petroleum, natural gas, or any combination thereof. Additionally or alternatively, the pipeline system 10 may be used to transport one or more other types of fluid, such as produced water, fresh water, fracturing fluid, flowback fluid, carbon dioxide, or any combination thereof.

To facilitate flowing fluid to the bore fluid destination 14, in some embodiments, the bore fluid source 12 may include one or more bore fluid pumps 16 that are implemented and/or operated to inject (e.g., pump and/or supply) fluid from the bore fluid source 12 into a bore of the pipeline system 10. However, it should be appreciated that the depicted example is merely intended to be illustrative and not limiting. In particular, in other embodiments, one or more bore fluid pumps 16 may not be implemented at the bore fluid source 12, for example, when fluid flow through the bore of the pipeline system 10 is produced by gravity. Additionally or alternatively, in other embodiments, one or more bore fluid pumps 16 may be implemented in the pipeline system 10 and/or at the bore fluid destination 14.

To facilitate transporting fluid from the bore fluid source 12 to the bore fluid destination 14, as in the depicted example, a pipeline system 10 may include one or more pipe fittings (e.g., connectors) 18 and one or more pipe segments 20. For example, the depicted pipeline system 10 includes a first pipe segment 20A, a second pipe segment 20B, and an Nth pipe segment 20N. Additionally, the depicted pipeline system 10 includes a first pipe (e.g., end) fitting 18A, which couples the bore fluid source 12 to the first pipe segment 20A, a second pipe (e.g., midline) fitting 18B, which couples the first pipe segment 20A to the second pipe segment 20B, and an Nth pipe (e.g., end) fitting 18N, which couples the Nth pipe segment 20N to the bore fluid destination 14.

However, it should again be appreciated that the depicted example is merely intended to be illustrative and not limiting. In particular, in other embodiments, a pipeline system 10 may include fewer (e.g., one) pipe segments 20. Additionally or alternatively, in other embodiments, a pipeline system 10 may include fewer (e.g., two) pipe fittings 18.

In any case, as described above, a pipe segment 20 generally includes tubing that may be used to convey (e.g., transfer and/or transport) water, gas, oil, and/or any other suitable type of fluid. The tubing of a pipe segment 20 may be made of any suitable type of material, such as plastic, metal, and/or a composite (e.g., fiber-reinforced composite) material. In fact, as will be described in more detail below, in some embodiments, the tubing of a pipe segment 20 may be implemented using multiple different layers. For example, the tubing of a pipe segment 20 may include a first high-density polyethylene (e.g., internal corrosion protection) layer, one or more reinforcement (e.g., steel strip) layers external to the first high-density polyethylene layer, and a second high-density polyethylene (e.g., external corrosion protection) layer external to the one or more reinforcement layers.

Additionally, as in the depicted example, one or more (e.g., second and/or Nth) pipe segments 20 in a pipeline system 10 may be curved. To facilitate implementing a curve in a pipe segment 20, in some embodiments, the pipe segment 20 may be flexible, for example, such that the pipe segment 20 is spoolable on a reel and/or in a coil (e.g., during transport and/or before deployment of the pipe segment 20). In other words, in some embodiments, one or more pipe segments 20 in the pipeline system 10 may be a flexible pipe, such as a bonded flexible pipe, an unbonded flexible pipe, a flexible composite pipe (FCP), a thermoplastic composite pipe (TCP), or a reinforced thermoplastic pipe (RTP). In fact, at least in some instances, increasing flexibility of a pipe segment 20 may facilitate improving deployment efficiency of a pipeline system 10, for example, by obviating a curved (e.g., elbow) pipe fitting 18 and/or enabling the pipe segment 20 to be transported to the pipeline system 10, deployed in the pipeline system 10, or both using a tighter spool.

To facilitate improving pipe flexibility, in some embodiments, the tubing of a pipe segment 20 that defines (e.g., encloses) its pipe bore may include one or more openings devoid of solid material. In fact, in some embodiments, an opening in the tubing of a pipe segment 20 may run (e.g., span) the length of the pipe segment 20 and, thus, define (e.g., enclose) a fluid conduit in the annulus of the tubing, which is separate from the pipe bore. In other words, in such embodiments, fluid may flow through a pipe segment 20 via its pipe bore, a fluid conduit implemented within its tubing annulus, or both.

Figure 2:
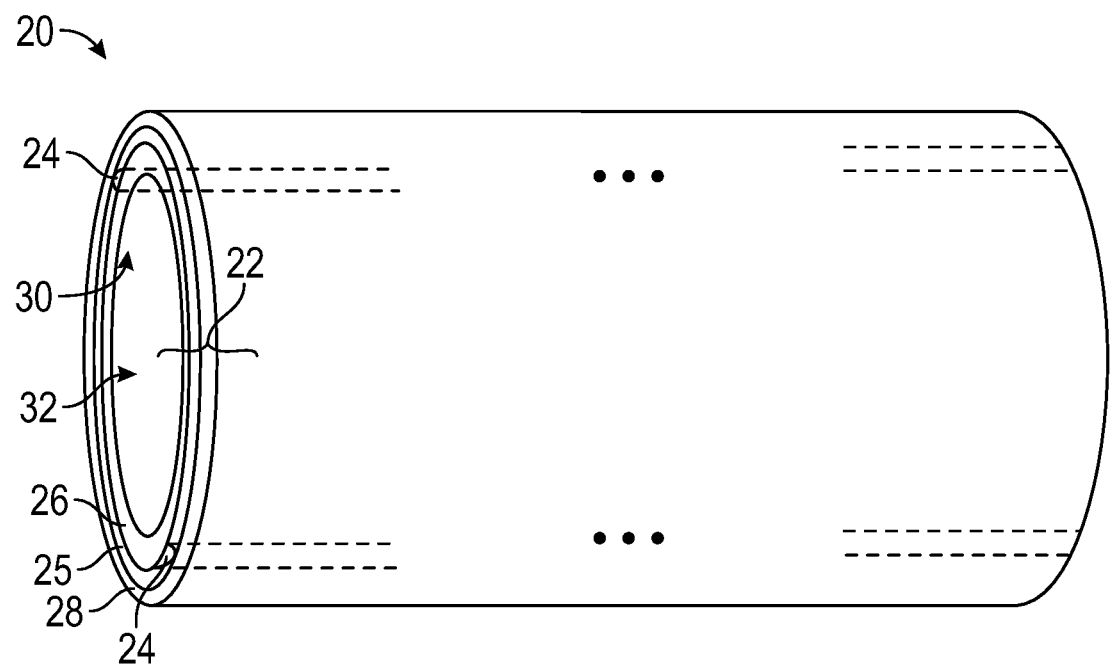
FIG. 2 is a side view of an example of a pipe segment of FIG. 1 that includes a pipe bore defined by its tubing as well as fluid conduits implemented within an annulus of its tubing, in accordance with an embodiment of the present disclosure.

To help illustrate, an example of a pipe segment 20, which includes tubing 22 with fluid conduits 24 implemented in a tubing annulus 25, is shown in FIG. 2. As depicted, the pipe segment tubing 22 is implemented with multiple layers including an inner (e.g., innermost) barrier layer 26 and an outer (e.g., outermost) barrier layer 28. In some embodiments, the inner barrier layer 26 and/or the outer barrier layer 28 of the pipe segment tubing 22 may be implemented using composite material and/or plastic, such as high-density polyethylene (HDPE) and/or raised temperature polyethylene (PE-RT). Although a number of particular layers are depicted, it should be understood that the techniques described in the present disclosure may be broadly applicable to composite pipe body structures including two or more layers, for example, as distinguished from a rubber or plastic single-layer hose subject to vulcanization. In any case, as depicted, an inner surface 30 of the inner barrier layer 26 defines (e.g., encloses) a pipe bore 32 through which fluid can flow, for example, to facilitate transporting fluid from a bore fluid source 12 to a bore fluid destination 14.

Additionally, as depicted, the annulus 25 of the pipe segment tubing 22 is implemented between its inner barrier layer 26 and its outer barrier layer 28. As will be described in more detail below, the tubing annulus 25 may include one or more intermediate layer of the pipe segment tubing 22. Furthermore, as depicted, fluid conduits 24 running along the length of the pipe segment 20 are defined (e.g., enclosed) in the tubing annulus 25. As described above, a fluid conduit 24 in the tubing annulus 25 may be devoid of solid material. As such, pipe segment tubing 22 that includes one or more fluid conduits 24 therein may include less solid material and, thus, exert less resistance to flexure, for example, compared to solid pipe segment tubing 22 and/or pipe segment tubing 22 that does not include fluid conduits 24 implemented therein. Moreover, to facilitate further improving pipe flexibility, in some embodiments, one or more layers in the tubing 22 of a pipe segment 20 may be unbonded from one or more other layers in the tubing 22 and, thus, the pipe segment 20 may be an unbonded pipe.

However, it should be appreciated that the depicted example is merely intended to be illustrative and not limiting. In particular, in other embodiments, pipe segment tubing 22 may include fewer (e.g., one) or more (e.g., three, four, or more) fluid conduits 24 defined in its tubing annulus 25. Additionally, although a single tubing annulus 25 is depicted, as will be described in more detail below, the present disclosure provides techniques for implementing a pipe segment 20 with multiple (e.g., dual) tubing annuli 25. Furthermore, in other embodiments, a fluid conduit 24 defined in a tubing annulus 25 of a pipe segment 20 run non-parallel to the pipe bore 32 of the pipe segment 20, for example, such that the fluid conduit 24 is skewed relative to the axial (e.g., longitudinal) extent of the pipe bore 32.

Figure 3:
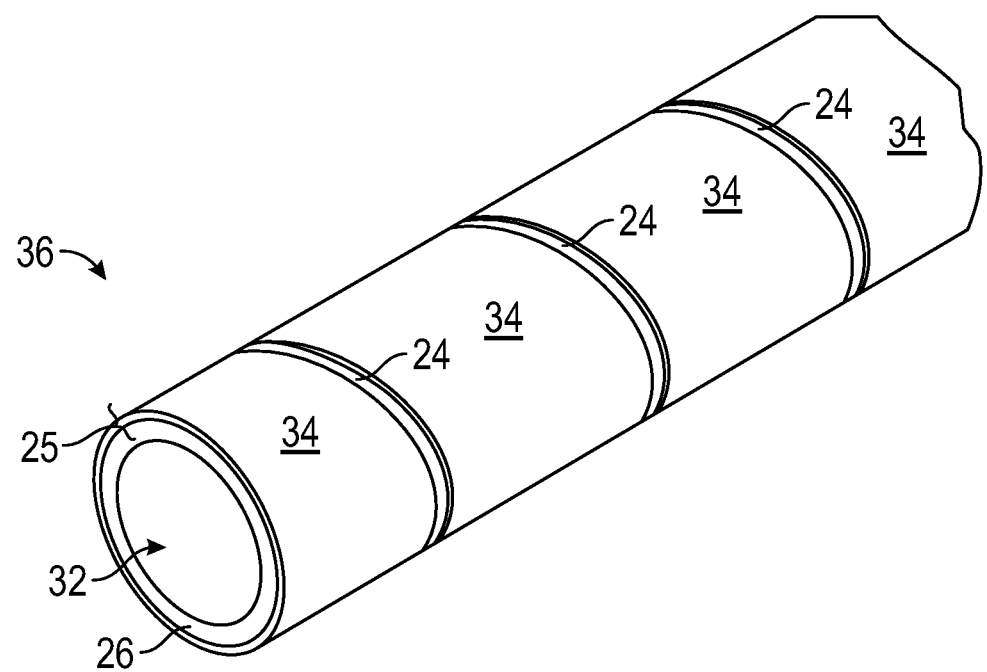
FIG. 3 is a perspective view of an example of a portion of the pipe segment of FIG. 2 with a helically shaped fluid conduit implemented within the annulus of its tubing, in accordance with an embodiment of the present disclosure.

To help illustrate, an example of a portion 36 of a pipe segment 20, which includes an inner barrier layer 26 and an intermediate layer 34 included in a tubing annulus 25 of its pipe segment tubing 22, is shown in FIG. 3. In some embodiments, one or more intermediate layers 34 of the pipe segment tubing 22 may be implemented at least in part using composite material, a polymer (e.g., plastic), and/or metal, such as carbon steel, stainless steel, duplex stainless steel, super duplex stainless steel, or any combination thereof. In other words, at least in some such embodiments, an intermediate layer 34 of the pipe segment tubing 22 may be implemented using electrically conductive, which, at least in some instances, may enable communication of electrical (e.g., test and/or return) signals via the intermediate layer 34.

In any case, as depicted, the intermediate layer 34 is helically disposed (e.g., wound and/or wrapped) on the inner barrier layer 26 such that gaps (e.g., openings) are left between adjacent windings to define a fluid conduit 24. In other words, in some embodiments, the intermediate layer 34 may be implemented at least in part by winding a solid strip of material around the inner barrier layer 26 at a non-zero lay angle (e.g., fifty-four degrees) relative to the axial (e.g., longitudinal) extent of the pipe bore 32. In any case, as depicted, the resulting fluid conduit 24 runs helically along the pipe segment 20, for example, such that the fluid conduit 24 is skewed fifty-four degrees relative to the axial extent of the pipe bore 32.

In some embodiments, an outer barrier layer 28 may be disposed directly over the depicted intermediate layer 34 and, thus, cover and/or define (e.g., enclose) the depicted fluid conduit 24. However, in other embodiments, the tubing annulus 25 of pipe segment tubing 22 may include multiple (e.g., two, three, four, or more) intermediate layers 34. In other words, in such embodiments, one or more other intermediate layers 34 may be disposed over the depicted intermediate layer 34. In fact, in some such embodiments, the one or more other intermediate layers 34 may also each be helically disposed such that gaps are left between adjacent windings to implement one or more corresponding fluid conduits 24 in the pipe segment tubing 22.

For example, a first other intermediate layer 34 may be helically disposed on the depicted intermediate layer 34 using the same non-zero lay angle as the depicted intermediate layer 34 to cover (e.g., define and/or enclose) the depicted fluid conduit 24 and to implement another fluid conduit 24 in the first other intermediate layer 34. Additionally, a second other intermediate layer 34 may be helically disposed on the first other intermediate layer 34 using another non-zero lay angle, which is the inverse of the non-zero lay angle of the depicted intermediate layer 34, to implement another fluid conduit 24 in the second other intermediate layer 34. Furthermore, a third other intermediate layer 34 may be helically disposed on the second other intermediate layer 34 using the same non-zero lay angle as the second other intermediate layer 34 to cover the other fluid conduit 24 in the second other intermediate layer 34 and to implement another fluid conduit 24 in the third other intermediate layer 34. In some embodiments, an outer barrier layer 28 may be disposed over the third other intermediate layer 34 and, thus, cover (e.g., define and/or enclose) the other fluid conduit 24 in the third other intermediate layer 34.

In any case, as described above, in some embodiments, the depicted intermediate layer 34 may be implemented using a solid material that has a stronger tensile strength and/or a stronger linear elasticity modulus (e.g., stiffness) as compared to a solid material used to implement the inner barrier layer 26 and the outer barrier layer 28 of the pipe segment tubing 22. For example, the depicted intermediate layer 34 may be implemented using metal, such as steel, while the inner barrier layer 26 and the outer barrier layer 28 are implemented using plastic, such as high-density polyethylene (HDPE). In other words, in such embodiments, the depicted intermediate layer 34 may be a reinforcement layer of the pipe segment tubing 22 and the depicted tubing annulus 25 may be a reinforcement tubing annulus 25 of the pipe segment tubing 22.

Figure 4:
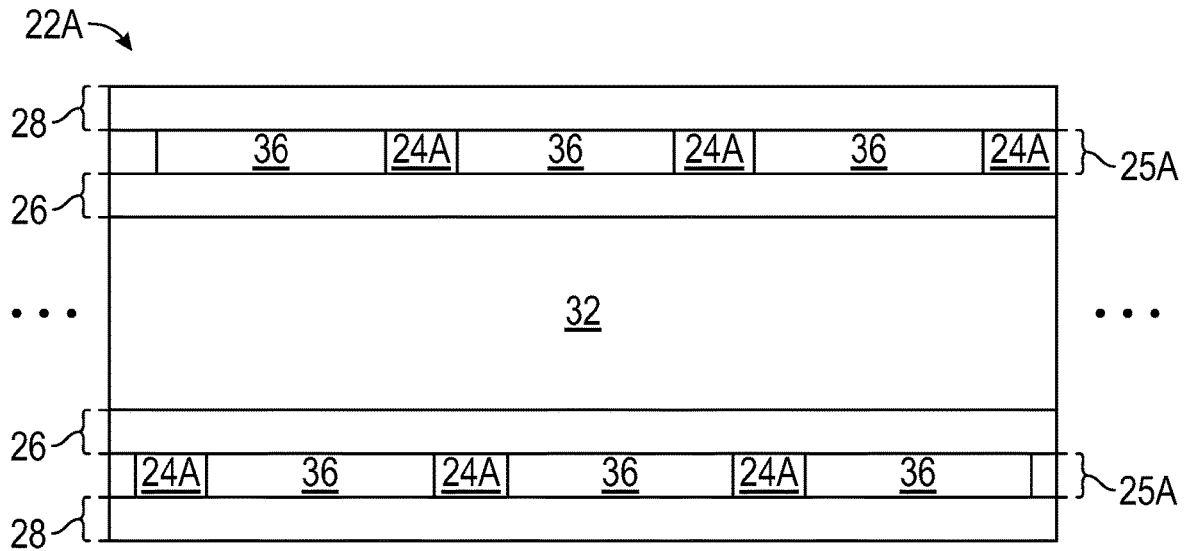
FIG. 4 is an axial cross-section profile of an example of a pipe segment that includes a single tubing annulus, in accordance with an embodiment of the present disclosure.

To help illustrate, an example of pipe segment tubing 22A that includes a reinforcement (e.g., intermediate) layer 36 and a reinforcement tubing annulus 25A is shown in FIG. 4. In particular, as depicted, the reinforcement layer 36 is implemented to define a reinforcement fluid conduit 24A in the reinforcement tubing annulus 25A. In some embodiments, the reinforcement layer 36 of the pipe segment tubing 22A may be implemented using metal, such as carbon steel, stainless steel, duplex stainless steel, super duplex stainless steel, or any combination thereof.

However, it should be appreciated that the depicted example is merely intended to be illustrative and not limiting. In particular, although a single reinforcement layer 36 is depicted, as described above, in other embodiments, the reinforcement tubing annulus 25A of a pipe segment 20 may include multiple reinforcement layers 36. Moreover, although a single tubing annulus 25 is depicted, as will be described in more detail below, the present disclosure provides techniques for implementing a pipe segment 20 with multiple (e.g., dual) tubing annuli 25, for example, which includes one or more venting tubing annuli 25 in addition to a reinforcement tubing annulus 25A.

In any case, as depicted, the pipe segment tubing 22A additionally includes an inner barrier layer 26, which is implemented to define a pipe bore 32, and an outer barrier layer 28, which is implemented around the reinforcement tubing annulus 25A. To facilitate providing fluid isolation, as described above, in some embodiments, the inner barrier layer 26 and the outer barrier layer 28 may each be implemented using a continuous solid layer of plastic, such as high-density polyethylene (HDPE) and/or raised temperature polyethylene (PE-RT). In other words, when the reinforcement layer 36 is implemented using metal, in such embodiments, the reinforcement layer 36 may provide more tensile strength and/or more hoop strength as compared to the inner barrier layer 26 and the outer barrier layer 28 of the pipe segment tubing 22A.

However, at least in some instances, even when implemented as a continuous solid layer of material, some amount of fluid may nevertheless permeate from the pipe bore 32 through the inner barrier layer 26 and/or from external environmental conditions through the outer barrier layer 28. In other words, in the depicted example, the fluid that permeates through the inner barrier layer 26 and/or the outer barrier layer 28 may flow into the reinforcement fluid conduit 24A defined by the reinforcement layer 36 and, thus, contact the solid material of the reinforcement layer 36. As described above, in some embodiments, the inner barrier layer 26 and/or the outer barrier layer 28 may be implemented using different types of solid material as compared to a reinforcement layer 36 of pipe segment tubing 22, for example, such that the inner barrier layer 26 and the outer barrier layer 28 are implemented using plastic while the reinforcement layer 36 is implemented using metal. In fact, in some instances, the solid material used to implement the reinforcement layer 36 may be more susceptible to corrosion as compared to the solid material used to implement the inner barrier layer 26 and/or the outer barrier layer 28.

Thus, to facilitate improving the tensile strength and/or hoop strength of a pipe segment 20, the present disclosure provides techniques for implementing pipe segment tubing 22 such that the pipe segment tubing 22 facilitates venting fluid that may potentially corrode the solid material in a reinforcement layer 36 of the pipe segment tubing 22 out from within the pipe segment tubing 22 before the potentially corrosive fluid reaches the reinforcement layer 36 of the pipe segment tubing 22, for example, at least in part by routing the potentially corrosive fluid to a vent port on a pipe fitting 18 that is fluidly coupled to the pipe segment tubing 22. As will be described in more detail below, to facilitate venting fluid, the present disclosure provides techniques for implementing a pipe segment 20 to include one or more venting tubing annuli 25 in addition to a reinforcement tubing annulus 25A. In particular, in some embodiments, a venting tubing annulus 25B may be implemented external to the reinforcement tubing annulus 25A and, thus, facilitate reducing the amount and/or likelihood of fluid (e.g., potentially corrosive fluid) permeating into the reinforcement tubing annulus 25A of the pipe segment 20, for example, in addition to reducing the amount and/or likelihood of fluid permeating into a pipe bore 32 of the pipe segment 20 and, thus, contaminating fluid (e.g., clean and/or potable water) in the pipe bore 32. Additionally or alternatively, a venting tubing annulus 25 may be implemented internal to the reinforcement tubing annulus 25A and, thus, facilitate reducing the amount and/or likelihood of fluid (e.g., potentially corrosive fluid) permeating into the reinforcement tubing annulus 25A of the pipe segment 20.

Figure 5:
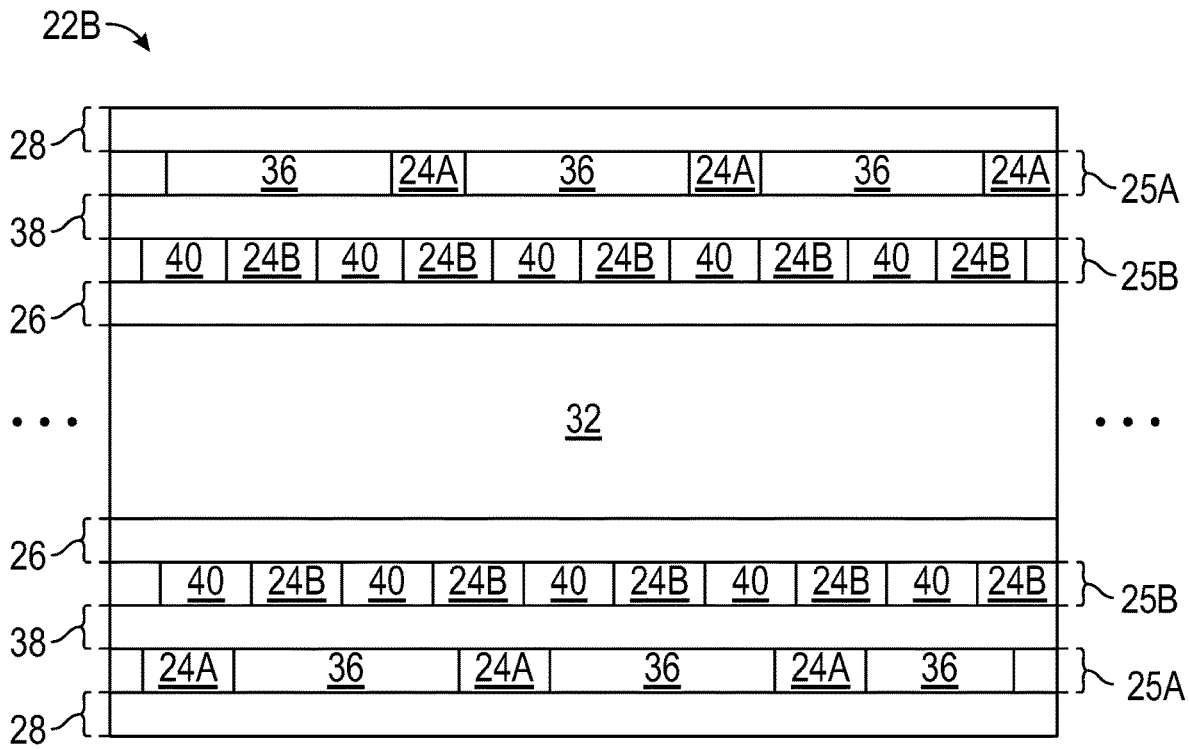
FIG. 5 is an axial cross-section profile of an example of a pipe segment that includes multiple (e.g., dual) tubing annuli, in accordance with an embodiment of the present disclosure.

To help illustrate, an example of pipe segment tubing 22B, which includes a reinforcement tubing annulus 25A and a venting tubing annulus 25B, is shown in FIG. 5. In particular, as depicted the reinforcement tubing annulus 25A includes a reinforcement layer 36 that is implemented to define a reinforcement fluid conduit 24A. In some embodiments, the reinforcement layer 36 of FIG. 5 may generally match the reinforcement layer 36 of FIG. 4 and/or the reinforcement fluid conduit 24A of FIG. 5 may generally match the reinforcement fluid conduit 24A of FIG. 4.

In any case, as depicted in FIG. 5, the pipe segment tubing 22B additionally includes an inner barrier layer 26 and an outer barrier layer 28. In particular, as depicted, the inner barrier layer 26 is implemented to define a pipe bore 32 and the outer barrier layer 28 is implemented around the reinforcement tubing annulus 25A. In some embodiments, the inner barrier layer 26 of FIG. 5 may generally match the inner barrier layer 26 of FIG. 4 and/or the outer barrier layer 28 of FIG. 5 may generally match the outer barrier layer 28 of FIG. 4.

In addition to the inner barrier layer 26 and the outer barrier layer 28, as depicted in FIG. 5, the pipe segment tubing 22B includes an intermediate barrier layer 38, which is implemented to separate the reinforcement tubing annulus 25A and the venting tubing annulus 25B. To facilitate providing fluid isolation, in some embodiments, the intermediate barrier layer 38 may be implemented using a continuous solid layer of a polymer (e.g., plastic), such as high-density polyethylene (HDPE) and/or raised temperature polyethylene (PE-RT). In fact, in some embodiments, the intermediate barrier layer 38 may be implemented using the same solid material as the inner barrier layer 26 and/or the outer barrier layer 28. However, in other embodiments, the intermediate barrier layer 38 may be implemented using a different solid material as compared to the inner barrier layer 26 and/or the outer barrier layer 28. In particular, in some such embodiments, the intermediate barrier layer 38 may be implemented with a solid material that is less permeable to fluid (e.g., potentially corrosive fluid) as compared to the solid material used to implement the inner barrier layer 26, for example, to facilitate venting fluid out from the venting tubing annulus 25B faster than the fluid permeates into the venting tubing annulus 25B and, thus, reducing permeation of the fluid into the reinforcement tubing annulus 25A that is implemented external to the venting tubing annulus 25B.

To facilitate venting fluid therefrom, as depicted, the venting tubing annulus 25B includes a venting layer 40 that is implemented to facilitate defining a venting fluid conduit 24B, for example, which may be fluidly coupled to a vent port implemented on a pipe fitting 18. In particular, in some embodiments, the venting layer 40 may be implemented with a solid material that is less susceptible to corrosion as compared to the solid material used to implement the reinforcement layer 36. Additionally, in some embodiments, the venting layer 40 may be implemented with a solid material that resists permeation of fluid that is potentially corrosive to the solid material used to implement the reinforcement layer 36. For example, the venting layer 40 may be implemented using a polymer (e.g., plastic) and/or aluminum while the reinforcement layer 36 is implemented using steel. Thus, in such embodiments, implementing pipe segment tubing 22 in this manner may facilitate venting fluid (e.g., potentially corrosive fluid) that permeates through an inner barrier layer 26 of the pipe segment tubing 22 before it reaches a reinforcement tubing annulus 25A of the pipe segment tubing 22, for example, at least in part by using a venting tubing annulus 25B implemented between the inner barrier layer 26 and the reinforcement tubing annulus 25A to route the fluid to a vent port on a pipe fitting 18 that is fluidly coupled to the venting tubing annulus 25A.

However, it should be appreciated that the depicted example is merely intended to be illustrative and not limiting. In particular, although a single venting layer 40 is depicted, in other embodiments, the venting tubing annulus 25B of a pipe segment 20 may include multiple venting layers 40. Additionally or alternatively, although a single reinforcement layer 36 is depicted, as described above, in other embodiments, the reinforcement tubing annulus 25A of a pipe segment 20 may include multiple reinforcement layers 36. Furthermore, as will be described in more detail below, in other embodiments, pipe segment tubing 22 may be implemented to include multiple venting tubing annuli 25B, for example, which include a first venting tubing annuli 25B that is implemented internal to a reinforcement tubing annulus 25A of the pipe segment tubing 22 and a second venting tubing annuli 25B that is implemented external to the reinforcement tubing annulus 25A of the pipe segment tubing 22. Moreover, as will be described in more detail below, in other embodiments, pipe segment tubing 22 may additionally include barrier tape, for example, implemented between a reinforcement layer 36 and an outer barrier layer 28 of the pipe segment tubing 22, between a venting layer 40 and an intermediate barrier layer 38 of the pipe segment tubing 22, between a reinforcement layer 36 and an intermediate barrier layer 38 of the pipe segment tubing 22, between a venting layer 40 and an outer barrier layer 28 of the pipe segment tubing 22, or any combination thereof.

In any case, in some embodiments, an intermediate barrier layer 38 of a pipe segment 20 may be implemented at least in part by extruding (e.g., melting and pulling) the intermediate barrier layer 38 over a venting tubing annulus 25B of the pipe segment 20. However, at least in some instances, extruding the intermediate barrier layer 38 may result in the intermediate barrier layer 38 at least partially falling into a venting fluid conduit 24B defined in the venting tubing annulus 25B. In other words, in such instances, the intermediate barrier layer 38 may at least partially block the venting fluid conduit 24B, which, at least in some instances, may increase the fluid pressure within the venting tubing annulus 25B and, thus, reduce the likelihood that fluid (e.g., potentially corrosive fluid) is vented out from the venting tubing annulus 25B before permeating through the intermediate barrier layer 38 into the reinforcement tubing annulus 25A of the pipe segment 20. To facilitate reducing the likelihood of the intermediate barrier layer 38 inadvertently blocking the venting fluid conduit 24B defined in the venting tubing annulus 25B, in some embodiments, barrier tape may be implemented therebetween.

Figure 6:
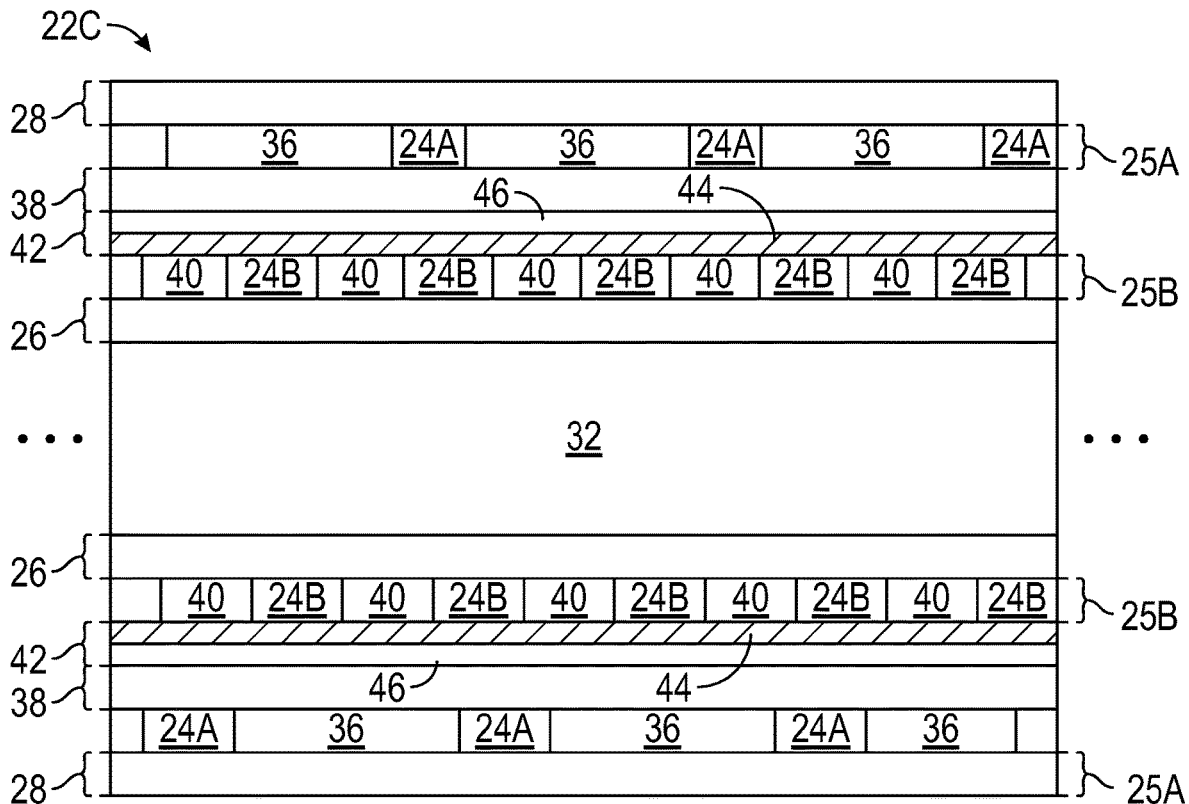
FIG. 6 is an axial cross-section profile of an example of the multiple tubing annuli pipe segment of FIG. 5 with a barrier tape implemented in a first orientation, in accordance with an embodiment of the present disclosure.

To help illustrate, another example of pipe segment tubing 22C, which includes barrier tape 42 implemented between its venting tubing annulus 25B and its intermediate barrier layer 38, is shown in FIG. 6. In particular, as depicted, the venting tubing annulus 25B of the pipe segment tubing 22C includes a venting layer 40 that implemented to facilitate defining a venting fluid conduit 24B. In some embodiments, the venting tubing annulus 25B of FIG. 6 may generally match the venting tubing annulus 25B of FIG. 5.

As depicted, the pipe segment tubing 22C additionally includes an inner barrier layer 26, an outer barrier layer 28, and a reinforcement tubing annulus 25A. In particular, as depicted, the reinforcement tubing annulus 25A of the pipe segment tubing 22C includes a reinforcement layer 36 that is implemented to facilitate defining a reinforcement fluid conduit 24A. In some embodiments, the inner barrier layer 26 of FIG. 6 may generally match the inner barrier layer 26 of FIG. 4, the outer barrier layer 28 of FIG. 6 may generally match the outer barrier layer 28 of FIG. 4, and/or the reinforcement tubing annulus 25A of FIG. 6 may generally match the reinforcement tubing annulus 25A of FIG. 4. Additionally, in some embodiments, the intermediate barrier layer 38 of FIG. 6 may generally match the intermediate barrier layer 38 of FIG. 5.

However, as depicted in FIG. 6, barrier tape 42 is implemented between the intermediate barrier layer 38 and the venting tubing annulus 25B of the pipe segment tubing 22C. In particular, as in the depicted example, barrier tape 42 implemented in a pipe segment 20 may include an adhesive layer 44 and a barrier layer 46. In some embodiments, the adhesive layer 44 of barrier tape 42 may be heat activated. Additionally, in some embodiments, the barrier layer 46 of barrier tape 42 may be implemented with a permeation resistant material, such as a polymer (e.g., plastic) and/or aluminum. In other words, in some such embodiments, the barrier layer 46 of the barrier tape 42 may be implemented with a solid material that is more resistant to permeation of fluid (e.g., potentially corrosive fluid) than the adhesive material used to implement the adhesive layer 44 of the barrier tape 42.

In any case, in the depicted example, the barrier tape 42 is implemented in an (e.g., first) orientation in which its adhesive layer 44 is oriented inwardly (e.g., facing pipe bore 32) and its barrier layer 46 is oriented outwardly (e.g., facing external environmental conditions). When the barrier layer 46 of the barrier tape 42 is more resistant to fluid permeation than the adhesive layer 44, at least in some instances, implementing the barrier tape 42 in this manner may result in fluid that permeates through the inner barrier layer 26 of the pipe segment tubing 22C also permeating through the adhesive layer 44 of the barrier tape 42 before being blocked by the barrier layer 46 of the barrier tape 42. In other words, during operation of a pipeline system 10 in which the pipe segment 22C is deployed, some amount of fluid may be present between the adhesive layer 44 and the barrier layer 46 of the barrier tape 42.

However, it should be appreciated that the depicted example is merely intended to be illustrative and not limiting. In particular, in other embodiments, a pipe segment 20 may additionally or alternatively include barrier tape 42 implemented between its reinforcement tubing annulus 25A and its outer barrier layer 28. In some such embodiments, the barrier tape 42 implemented between the reinforcement tubing annulus 25A and the outer barrier layer 28 may also be in an (e.g., first) orientation in which its adhesive layer 44 is oriented inwardly (e.g., facing pipe bore 32) and its barrier layer 46 is oriented outwardly (e.g., facing external environmental conditions).

In any case, as described above, during operation, a pipeline system 10 is generally pressurized to facilitate producing fluid flow therethrough. On the other hand, when not in operation, the pipeline system 10 may generally be depressurized. However, depressurizing fluid, such as gas, generally results in the fluid expanding in size. In fact, at least in some instance, expansion of fluid present between the adhesive layer 44 and the barrier layer 46 of the barrier tape 42 in a pipe segment 20 due to depressurization of a pipeline system 10 in which the pipe segment 20 is deployed may result in the adhesive layer 44 and the barrier layer 46 of the barrier tape 42 separating from one another and, thus, potentially producing a fault, such as a hole, in the barrier tape 42. As will be described in more detail below, to facilitate reducing the likelihood of faults occurring in barrier tape 42, in some embodiments, the barrier tape 42 may be implemented in a pipe segment 20 using an opposite (e.g., second and/or different) orientation.

Figure 7:
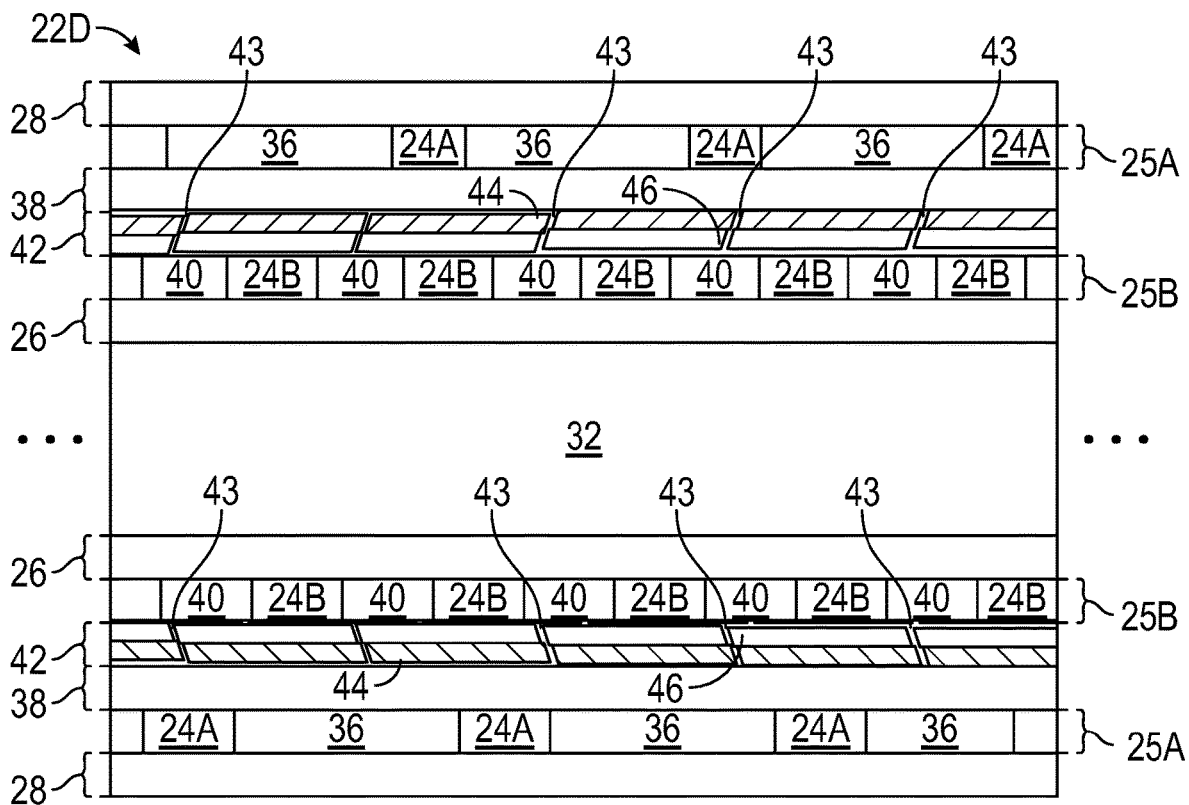
FIG. 7 is an axial cross-section profile of an example of the multiple tubing annuli pipe segment of FIG. 5 with a barrier tap implemented in a second (e.g., opposite) orientation, in accordance with an embodiment of the present disclosure.

To help illustrate, another example of pipe segment tubing 22D, which includes barrier tape 42, is shown in FIG. 7. As depicted, the pipe segment tubing 22D additionally include an inner barrier layer 26, an outer barrier layer 28, a reinforcement tubing annulus 25A, a venting tubing annulus 25B, and an intermediate barrier layer 40. In some embodiments, the inner barrier layer 26 of FIG. 7 may generally match the inner barrier layer 26 of FIG. 4, the outer barrier layer 28 of FIG. 7 may generally match the outer barrier layer 28 of FIG. 4, and/or the reinforcement tubing annulus 25A of FIG. 7 may generally match the reinforcement tubing annulus 25A of FIG. 4. Additionally, in some embodiments, the venting tubing annulus 25B of FIG. 7 may generally match the venting tubing annulus 25B of FIG. 5 and/or the intermediate barrier layer 38 of FIG. 7 may generally match the intermediate barrier layer 38 of FIG. 5.

Moreover, similar to FIG. 6, the barrier tape 42 in FIG. 7 includes an adhesive layer 44 and a barrier layer 46. As described above, the barrier tape 42 in FIG. 6 is implemented in a first orientation in which its adhesive layer 44 is oriented inwardly (e.g., facing pipe bore 32) and its barrier layer 46 is oriented outwardly (e.g., facing external environmental conditions). However, as depicted, the barrier tape 42 in FIG. 7 is implemented in a second (e.g., different and/or opposite) orientation in which its barrier layer 46 is oriented inwardly (e.g., facing pipe bore 32) and its adhesive layer 44 is oriented outwardly (e.g., facing external environmental conditions). As described above, in some embodiments, the barrier layer 46 of barrier tape 42 may be implemented with a solid material that is less susceptible to permeation of fluid (e.g., potentially corrosive fluid) as compared to the adhesive material used to implement the adhesive layer 44 of the barrier tape 42. In other words, in such embodiments, implementing the barrier tape 42 using the second orientation may enable the barrier layer 46 of the barrier tape 42 to block the fluid that permeates through the inner barrier layer 26 before it reaches the adhesive layer 44 of the barrier tape 42, which, at least in some instances, may facilitate reducing the amount of fluid that is present between the barrier layer 46 and the adhesive layer of the barrier tape 42 and, thus, the likelihood that depressurization of a pipeline system 10 in which the pipe segment tubing 22D is deployed causes a fault to develop in the barrier tape 42.

Additionally, as described above, in some embodiments, the adhesive layer 44 of barrier tape 42 may be heat activated. Furthermore, as described above, in some embodiments, an intermediate barrier layer 38 may be implemented around the barrier tape 42 at least in part by extruding the intermediate barrier layer 38. In fact, in some such embodiments, implementing the barrier tape 42 using the second orientation in which the adhesive layer 44 of the barrier tape 42 is oriented outwardly may facilitate obviating a separate heating process for activating the adhesive layer 44 and, thus, reducing implementation associated cost of a pipe segment 20, for example, due to heat application used to extrude the intermediate barrier layer 38 being sufficient to activate the adhesive layer 44 of the barrier tape 42.

In any case, as depicted, the barrier tape 42 may be wrapped around a venting layer 40 included in the venting tubing annulus 25B of the pipe segment tubing 22D to facilitate defining a venting fluid conduit 24B. For example, in some embodiments, the venting layer 40 may be helically wrapped on the inner barrier layer 26 to facilitate defining a helically-shaped venting fluid conduit 24B. To facilitate reducing the likelihood of fluid inadvertently leaking through the barrier tape 42, as in the depicted example, the barrier tape 42 may be wrapped such that adjacent wraps of the barrier tape 42 partially overlap. Additionally, to facilitate further reducing the likelihood of fluid inadvertently leaking through the barrier tape 42, as in the depicted example, the barrier tape 42 may be wrapped such that the junction 43 between adjacent wraps of the barrier tape 42 overlap (e.g., are aligned) with solid material used to implement the venting layer 40 on which the barrier tape 42 is wrapped.

However, it should be appreciated that the depicted example is merely intended to be illustrative and not limiting. In particular, in other embodiments, a pipe segment 20 may additionally or alternatively include barrier tape 42 implemented between its reinforcement tubing annulus 25A and its outer barrier layer 28. In some such embodiments, the barrier tape 42 between the reinforcement tubing annulus 25A and its outer barrier layer 28 may be also be implemented using a second orientation in which its barrier layer 46 is oriented inwardly (e.g., facing pipe bore 32) and its adhesive layer 44 is oriented outwardly (e.g., facing external environmental conditions). In any case, in this manner, the present disclosure provides techniques for implementing a pipe segment 20 with multiple tubing annuli 25, which, at least in some instances, may facilitate improving tensile strength and/or hoop strength of the pipe segment 20, for example, at least in part by enabling the pipe segment 20 to vent fluid (e.g., potentially corrosive fluid) that permeates through an inner barrier layer 26 of the pipe segment 20 before it reaches the solid material used to implement a reinforcement layer 36 in the pipe segment 20.

Figure 8:
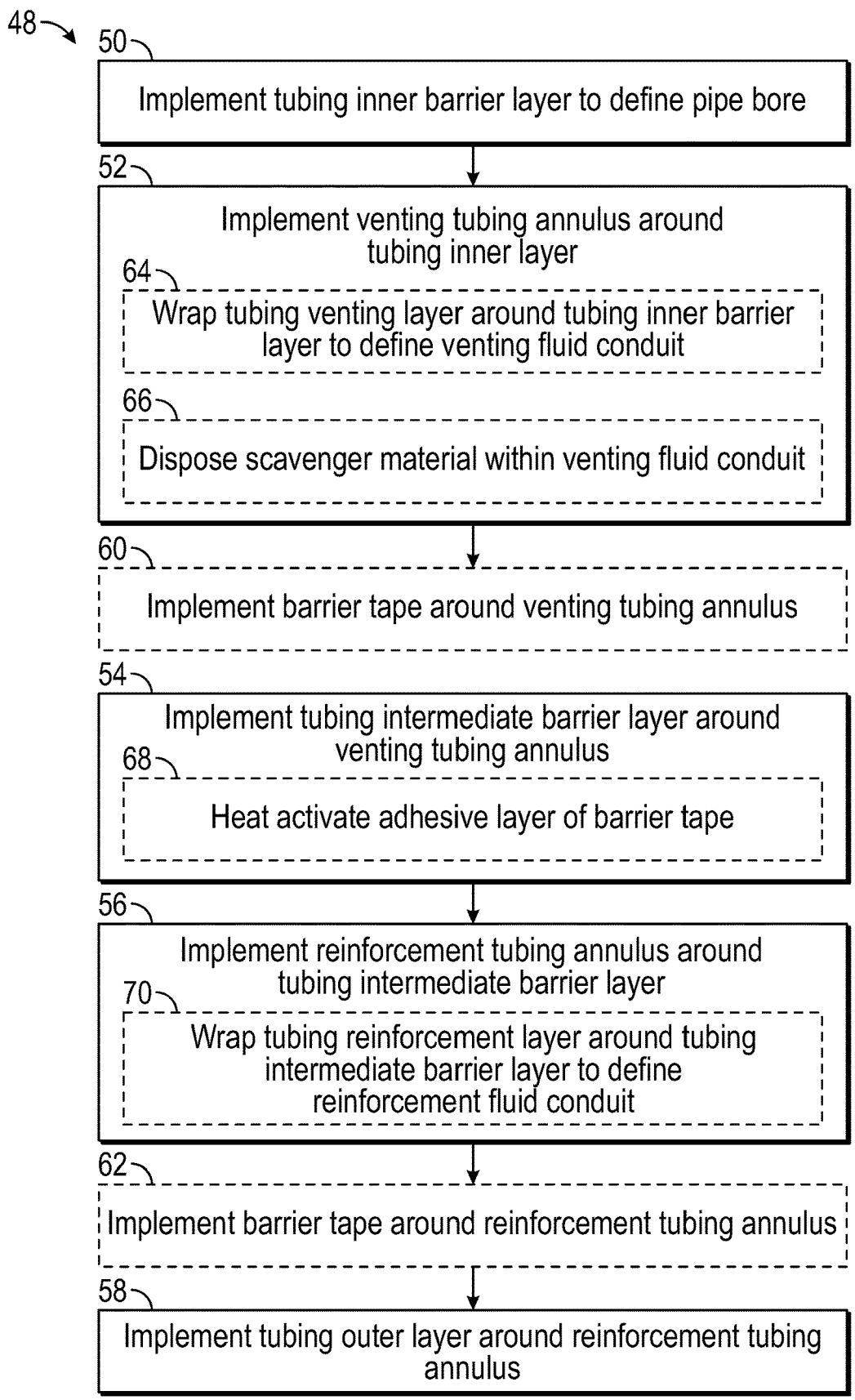
FIG. 8 is a flow diagram of an example process for implementing a multiple tubing annuli pipe segment, in accordance with an embodiment of the present disclosure.

To help further illustrate, an example of a process 48 for implementing a pipe segment 20 with multiple tubing annuli 25 is described in FIG. 8. Generally, the process 48 includes implementing a tubing inner barrier layer to define a pipe bore (process block 50) and implementing a venting tubing annulus around the tubing inner barrier layer (process block 52). Additionally, the process 48 includes implementing a tubing intermediate barrier layer around the venting tubing annulus (process block 54), implementing a reinforcement tubing annulus around the tubing intermediate barrier layer (process block 56), and implementing a tubing outer barrier layer around the reinforcement tubing annulus (process block 58).

Although described in a specific order, which corresponds with an embodiment of the present disclosure, it should be appreciated that the example process 48 is merely intended to be illustrative and not limiting. In particular, in other embodiments, a process 48 for implementing a pipe segment 20 with multiple tubing annuli 25 may include one or more additional process blocks and/or omit one or more of the depicted process blocks. For example, some embodiments of the process 48 may additionally include implementing barrier tape around the venting tubing annulus (process block 60) while other embodiments of the process 48 do not. Additionally or alternatively, some embodiments of the process 48 may additionally include implementing barrier tape around the reinforcement tubing annulus (process block 62) while other embodiments of the process 48 do not.

In any case, as described above, the tubing 22 of a pipe segment 20 may include an inner barrier layer 26, which is implemented to define a pipe bore 32 through the pipe segment 20. As such, implementing the pipe segment 20 may include implementing an inner barrier layer 26 to define a pipe bore 32 through the pipe segment 20 (process block 50). In particular, as described above, in some embodiments, the inner barrier layer 26 of pipe segment tubing 22 may be implemented using composite material and/or plastic, such as high-density polyethylene (HDPE) and/or raised temperature polyethylene (PE-RT). Additionally, in some embodiments, the inner barrier layer 26 may be implemented at least in part by extruding the inner barrier layer 26.

Furthermore, to facilitate venting fluid (e.g., potentially corrosive fluid) that permeates through its inner barrier layer 26, before the fluid reaches its reinforcement tubing annulus 25B as described above, the tubing 22 of a pipe segment 20 may include a venting tubing annulus 25B implemented around its inner barrier layer 26. As such, implementing the pipe segment 20 may include implementing a venting tubing annulus 25B around the inner barrier layer 26 of the pipe segment 20 (process block 52). In particular, as described above, the venting tubing annulus 25B may include one or more venting layers 40 that are each implemented using a solid material that is more resistant to permeation of fluid (e.g., potentially corrosive fluid) than the solid material used to implement the inner barrier layer 26. In other words, a venting layer 40 included in the venting tubing annulus 25B may be implemented using a permeation resistant material, such as a polymer (e.g., plastic) and/or aluminum.

Additionally, as described above, in some embodiments, a venting layer 40 included in a venting tubing annulus 25B of a pipe segment 20 may be implemented to enable the venting layer 40 to be wrapped on an inner barrier layer 26 of the pipe segment 20 such that the venting layer 40 facilitates defining a venting fluid conduit 24B. In other words, in such embodiments, implementing the venting tubing annulus 25B may include wrapping a venting layer 40 around the inner barrier layer 26 of the pipe segment 20 to facilitate defining a venting fluid conduit 24B (process block 64). For example, the venting layer 40 may be helically wrapped on the inner barrier layer 26 to facilitate defining a helically-shaped venting fluid conduit 24B. As described above, the venting fluid conduit 24B may facilitate venting fluid (e.g., potentially corrosive fluid) that permeates through the inner barrier layer 26 out from the pipe segment 20 before the fluid permeates into a reinforcement tubing annulus 25A of the pipe segment 20, which is implemented external to the venting tubing annulus 25B, for example, at least in part by routing the fluid to a vent port on a pipe fitting 18 that is fluidly coupled to the venting tubing annulus 25B of the pipe segment 20.

To facilitate further reducing the likelihood of potentially corrosive fluid permeating into its reinforcement tubing annulus 25A, in some embodiments, a pipe segment 20 may additionally include scavenger material disposed within a venting fluid conduit 24B defined in its venting tubing annulus 25B. In other words, in such embodiments, implementing the venting tubing annulus 25B may include disposing scavenger material within one or more venting fluid conduits 24B defined in the venting tubing annulus 25B of the pipe segment 20 (process block 66). For example, to facilitate reducing the likelihood of hydrogen sulfide ($H_2S$) permeating into the reinforcement tubing annulus 25A, the pipe segment 20 may include a scavenger material that consumes hydrogen sulfide in one or more of its venting fluid conduits 24B. Additionally or alternatively, to facilitate reducing the likelihood of carbon dioxide ($CO_2$) permeating into the reinforcement tubing annulus 25A, the pipe segment 20 may include a scavenger material that consumes carbon dioxide in one or more of its venting fluid conduits 24B.

Moreover, as described above, the tubing 22 of a pipe segment 20 may include an intermediate barrier layer 38, which is implemented around its venting tubing annulus 25B. As such, implementing the pipe segment 20 may include implementing an intermediate barrier layer 38 around its venting tubing annulus 25B (process block 54). In particular, as described above, in some embodiments, the intermediate barrier layer 38 of the pipe segment 20 may be implemented using a solid material that is more resistant to permeation of fluid (e.g., potentially corrosive fluid) than the solid material used to implement the inner barrier layer 40 of the pipe segment 20.

However, as described above, in some embodiments, the tubing 22 of a pipe segment 20 may include barrier tape 42 implemented between its venting tubing annulus 25B and its intermediate barrier layer 38. In other words, in such embodiments, implementing the pipe segment 20 may include implementing barrier tape 42 around its venting tubing annulus 25B, for example, before the intermediate barrier layer 38 is implemented (process block 60). That is, in such embodiments, implementing the barrier tape 42 may include implementing the barrier tape 42 around a venting layer 40 included in the venting tubing annulus 25B.

In any case, as described above, barrier tape 42 implemented in pipe segment tubing 22 may generally include an adhesive layer 44 and a barrier layer 46. In particular, as described above, in some embodiments, the barrier tape 42 may be implemented in the pipe segment 20 using a first orientation in which its adhesive layer 44 is oriented inwardly (e.g., facing venting tubing annulus 25B) and its barrier layer 46 is oriented outwardly (e.g., facing intermediate barrier layer 38). However, as described above, to facilitate reducing the likelihood of faults, such as a hole, developing in the barrier tape 42, in other embodiments, the barrier tape 42 may be implemented in the pipe segment 20 using a second (e.g., different and/or opposite) orientation in which its barrier layer 46 is oriented inwardly (e.g., facing venting tubing annulus 25B) and its adhesive layer 44 is oriented outwardly (e.g., facing intermediate barrier layer 38).

Furthermore, as described above, in some embodiments, the adhesive layer 44 of barrier tape 42 may be heat activated. Moreover, as described above, in some embodiments, the intermediate barrier layer 38 of a pipe segment 20 may be implemented at least in part by extruding the intermediate barrier layer 38. In fact, in some such embodiments, implementing the intermediate barrier layer 38 at least in part by extruding the intermediate barrier layer 38 may also heat activate the adhesive layer 44 of the barrier tape 42, which, at least in some instances, may facilitate reducing implementation associated cost of the pipe segment 20, for example, at least in part by obviating a separate heating process to activate the adhesive layer 44 of the barrier tape 42 (process block 68).

As described above, the tubing 22 of a pipe segment 20 may additionally include a reinforcement tubing annulus 25A, which is implemented around an intermediate barrier layer 38 of the pipe segment 20. As such, implementing the pipe segment 20 may include implementing a reinforcement tubing annulus 25A around the intermediate barrier layer 38 of the pipe segment 20 (process block 56). In particular, as described above, the reinforcement tubing annulus 25A may include one or more reinforcement layers 36 that are each implemented using a solid material that has a higher tensile strength and/or a higher linear elasticity modulus as compared to the solid material used to implement the inner barrier layer 26, the intermediate barrier layer 38, and/or an outer barrier layer 28 of the pipe segment 20. For example, a barrier layer (e.g., inner barrier layer 26, intermediate barrier layer 38, or outer barrier layer 28) of the pipe segment 20 may be implemented using plastic, such as high-density polyethylene (HDPE), while a reinforcement layer 36 of the pipe segment is implemented using metal, such as steel.

Additionally, as described above, in some embodiments, a reinforcement layer 36 included in a reinforcement tubing annulus 25A of a pipe segment 20 may be implemented to enable the reinforcement layer 36 to be wrapped on an intermediate barrier layer 38 of the pipe segment 20 such that the reinforcement layer 36 facilitates defining a reinforcement fluid conduit 24A. In other words, in such embodiments, implementing the reinforcement tubing annulus 25A may include wrapping a reinforcement layer 36 around the intermediate barrier layer 38 of the pipe segment 20 to facilitate defining a reinforcement fluid conduit 24A (process block 70). For example, the reinforcement layer 36 may be helically wrapped on the intermediate barrier layer 38 to facilitate defining a helically-shaped reinforcement fluid conduit 24A.

Furthermore, as described above, the tubing 22 of a pipe segment 20 may include an outer barrier layer 28, which is implemented around its reinforcement tubing annulus 25A. As such, implementing the pipe segment 20 may include implementing an outer barrier layer 28 around the reinforcement tubing annulus 25A of the pipe segment 20 (process block 58). In particular, as described above, in some embodiments, the outer barrier layer 28 of pipe segment tubing 22 may be implemented using composite material and/or plastic, such as high-density polyethylene (HDPE) and/or raised temperature polyethylene (PE-RT).

However, as described above, in some embodiments, the tubing 22 of a pipe segment 20 may include barrier tape 42 implemented between its reinforcement tubing annulus 25A and its outer barrier layer 28. In other words, in such embodiments, implementing the pipe segment 20 may include implementing barrier tape 42 around its reinforcement tubing annulus 25A, for example, before the outer barrier layer 28 is implemented (process block 62). That is, in such embodiments, implementing the barrier tape 42 may include implementing the barrier tape 42 around a reinforcement layer 36 included in the reinforcement tubing annulus 25A.

In any case, as described above, barrier tape 42 implemented in pipe segment tubing 22 may generally include an adhesive layer 44 and a barrier layer 46. In particular, as described above, in some embodiments, the barrier tape 42 may be implemented in the pipe segment 20 using a first orientation in which its adhesive layer 44 is oriented inwardly (e.g., facing reinforcement tubing annulus 25A) and its barrier layer 46 is oriented outwardly (e.g., facing outer barrier layer 28). However, as described above, to facilitate reducing the likelihood of faults, such as a hole, developing in the barrier tape 42, in other embodiments, the barrier tape 42 may be implemented in the pipe segment 20 using a second (e.g., different and/or opposite) orientation in which its barrier layer 46 is oriented inwardly (e.g., facing reinforcement tubing annulus 25A) and its adhesive layer 44 is oriented outwardly (e.g., facing outer barrier layer 28).

Furthermore, as described above, in some embodiments, the adhesive layer 44 of barrier tape 42 may be heat activated. Moreover, in some embodiments, the outer barrier layer 28 of a pipe segment 20 may be implemented at least in part by extruding the outer barrier layer 28. In fact, in some such embodiments, implementing the outer barrier layer 28 at least in part by extruding the outer barrier layer 28 may also heat activate the adhesive layer 44 of the barrier tape 42, which, at least in some instances, may facilitate reducing implementation associated cost of the pipe segment 20, for example, at least in part by obviating a separate heating process to activate the adhesive layer 44 of the barrier tape 42. In this manner, the present disclosure provides techniques for implementing a pipe segment with multiple tubing annuli, which, at least in some instances, may facilitate improving tensile strength and/or hoop strength of the pipe segment, for example, at least in part by enabling the pipe segment to vent fluid (e.g., potentially corrosive fluid) that permeates through an inner barrier layer of the pipe segment before it reaches the solid material used to implement a reinforcement layer in the pipe segment.

However, as described above, in some instances, fluid (e.g., potentially corrosive fluid and/or potentially contaminating fluid) may additionally or alternatively permeate through an outer barrier layer 28 of the tubing 22 of a pipe segment 20 and, thus, potentially contact one or more reinforcement layers 36 of the pipe segment tubing 22. In fact, in some such instances, the fluid may continue permeating through other layers of the pipe segment tubing 22 such that the fluid permeates through the inner barrier layer 26 into a pipe bore 32 of the pipe segment 20 and, thus, potentially contaminates bore fluid (e.g., clean and/or potable water) present in the pipe bore 32. As such, in some embodiments, the tubing 22 of the pipe segment 20 may be implemented to facilitate venting fluid that permeates through its outer barrier layer 28 before the fluid reaches a reinforcement layer 36 of the pipe segment tubing 22 and/or before the fluid permeates through the inner barrier layer 26 of the pipe segment tubing 22, for example, to facilitate improving the tensile strength of the pipe segment 20, hoop strength of the pipe segment 20, fluid isolation provided by the pipe segment 20, or any combination thereof. In particular, to facilitate venting fluid that permeates through the outer barrier layer 28 of pipe segment tubing 22, as described above, in some embodiments, a venting tubing annulus 25 may be implemented external to a reinforcement tubing annulus 25A of the pipe segment tubing 22.

Figure 9:
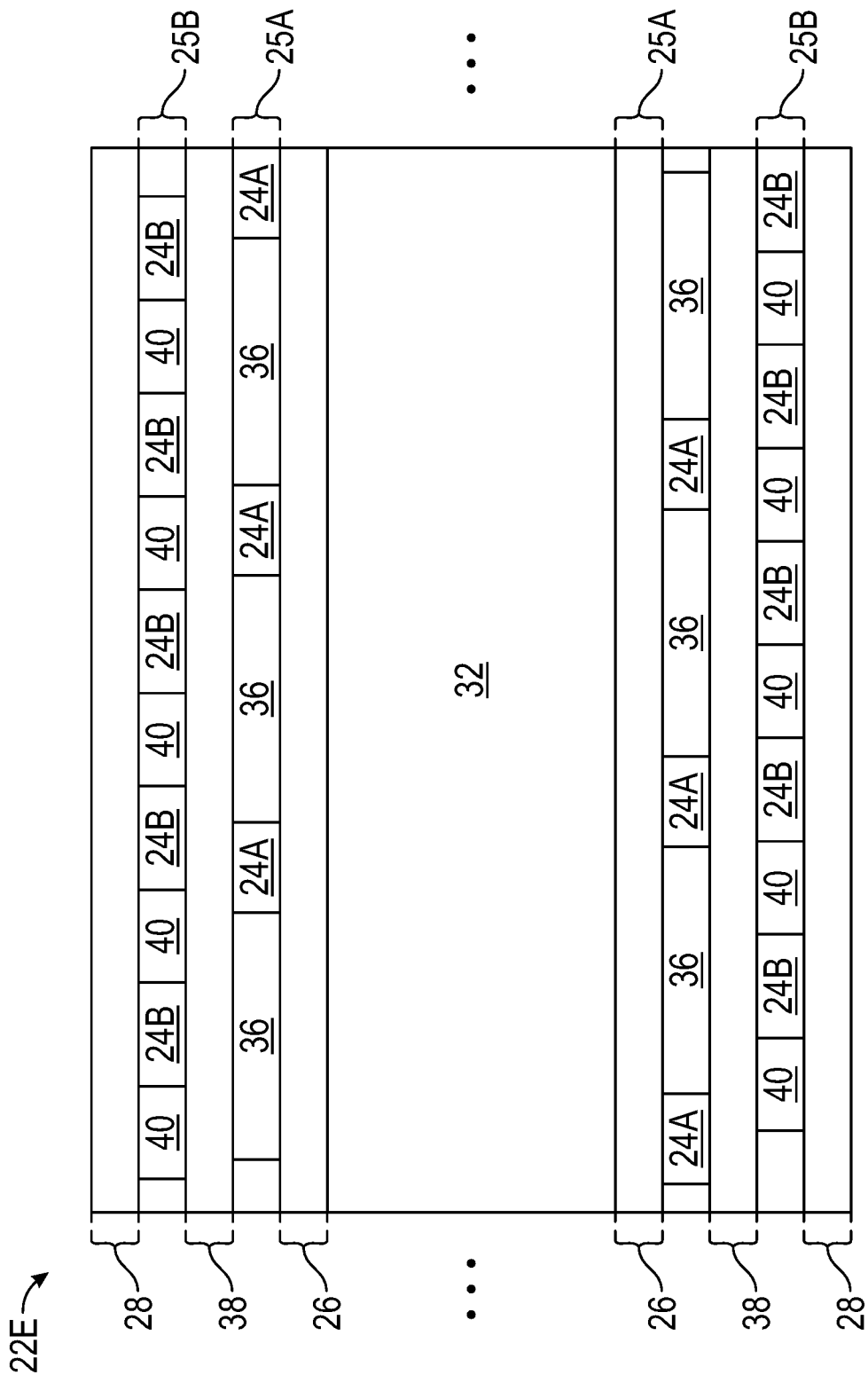
FIG. 9 is an axial cross-section profile of another example of a pipe segment that includes multiple (e.g., dual) tubing annuli, in accordance with an embodiment of the present disclosure.

To help illustrate, another example of pipe segment tubing 22E, which includes a reinforcement tubing annulus 25A and a venting tubing annulus 25B, is shown in FIG. 9. As depicted, the pipe segment tubing 22E additionally includes an inner barrier layer 26 that defines a pipe bore 32, an outer barrier layer 28, and an intermediate barrier layer 38. In some embodiments, the inner barrier layer 26 of FIG. 9 may generally match the inner barrier layer 26 of FIG. 5, the outer barrier layer 28 of FIG. 9 may generally match the outer barrier layer 28 of FIG. 5, the intermediate barrier layer 38 of FIG. 9 may generally match the intermediate barrier layer 38 of FIG. 5, or any combination thereof.

Additionally, as depicted in FIG. 9, the reinforcement tubing annulus 25A of the pipe segment tubing 22E includes a reinforcement layer 36 and the venting tubing annulus 25B of the pipe segment tubing 22E includes a venting layer 40. In particular, similar to FIG. 5, as depicted in FIG. 9, the reinforcement layer 36 of the pipe segment tubing 22E is implemented to define a reinforcement fluid conduit 24A. Furthermore, similar to FIG. 5, as depicted in FIG. 9, the venting layer 40 of the pipe segment tubing 22E is implemented to define a venting fluid conduit 24B, for example, which may be fluidly coupled to a vent port implemented on a pipe fitting 18.

However, as depicted in FIG. 9, the reinforcement tubing annulus 25A of the pipe segment tubing 22E is implemented internal to the intermediate barrier layer 38 and the venting tubing annulus 25B of the pipe segment tubing 22E is implemented external to the intermediate barrier layer 38. In other words, as depicted, the venting tubing annulus 25B and the intermediate barrier layer 38 of the pipe segment tubing 22E are implemented between the outer barrier layer 28 and the reinforcement tubing annulus 25A of the pipe segment tubing 22E. As described above, in some embodiments, an intermediate barrier layer 38 of pipe segment tubing 22 and a venting layer 40 included in a venting tubing annulus 25B of the pipe segment tubing 22 may be implemented using solid material that is more resistant to fluid permeation as compared to a solid material used to implement an outer barrier layer 28 of the pipe segment tubing 22. Thus, in such embodiments, implementing pipe segment tubing 22 in this manner may facilitate venting fluid (e.g., potentially corrosive fluid and/or potentially contaminating fluid) that permeates through an outer barrier layer 28 of the pipe segment tubing 22 before it reaches a reinforcement tubing annulus 25A of the pipe segment tubing 22 and/or a pipe bore 32 defined by the pipe segment tubing 22, for example, at least in part by using a venting tubing annulus 25B implemented between the outer barrier layer 28 and the reinforcement tubing annulus 25A to route the fluid to a vent port on a pipe fitting 18 that is fluidly coupled to the venting tubing annulus 25A.

However, it should be appreciated that the depicted example is merely intended to be illustrative and not limiting. In particular, in other embodiments, pipe segment tubing 22 may additionally include barrier tape 42, for example, implemented between a reinforcement layer 36 and an intermediate barrier layer 38 of the pipe segment tubing 22 and/or between a venting layer 40 and an outer barrier layer 28 of the pipe segment tubing 22. Moreover, as will be described in more detail below, in other embodiments, pipe segment tubing 22 may be implemented multiple venting tubing annuli 25B, for example, which include a first venting tubing annuli 25B that is implemented internal to a reinforcement tubing annulus 25A and a second venting tubing annuli 25B that is implemented external to the reinforcement tubing annulus 25A. In any case, in this manner, the present disclosure provides techniques for implementing a pipe segment 20 with multiple tubing annuli 25, which, at least in some instances, may facilitate improving tensile strength and/or hoop strength of the pipe segment 20, for example, at least in part by enabling the pipe segment 20 to vent fluid (e.g., potentially corrosive fluid and/or potentially contaminating fluid) that permeates through an outer barrier layer 28 of the pipe segment 20 before it reaches the solid material used to implement a reinforcement layer 36 in the pipe segment 20 and/or before it reaches a pipe bore 32 of the pipe segment 20.

Figure 10:
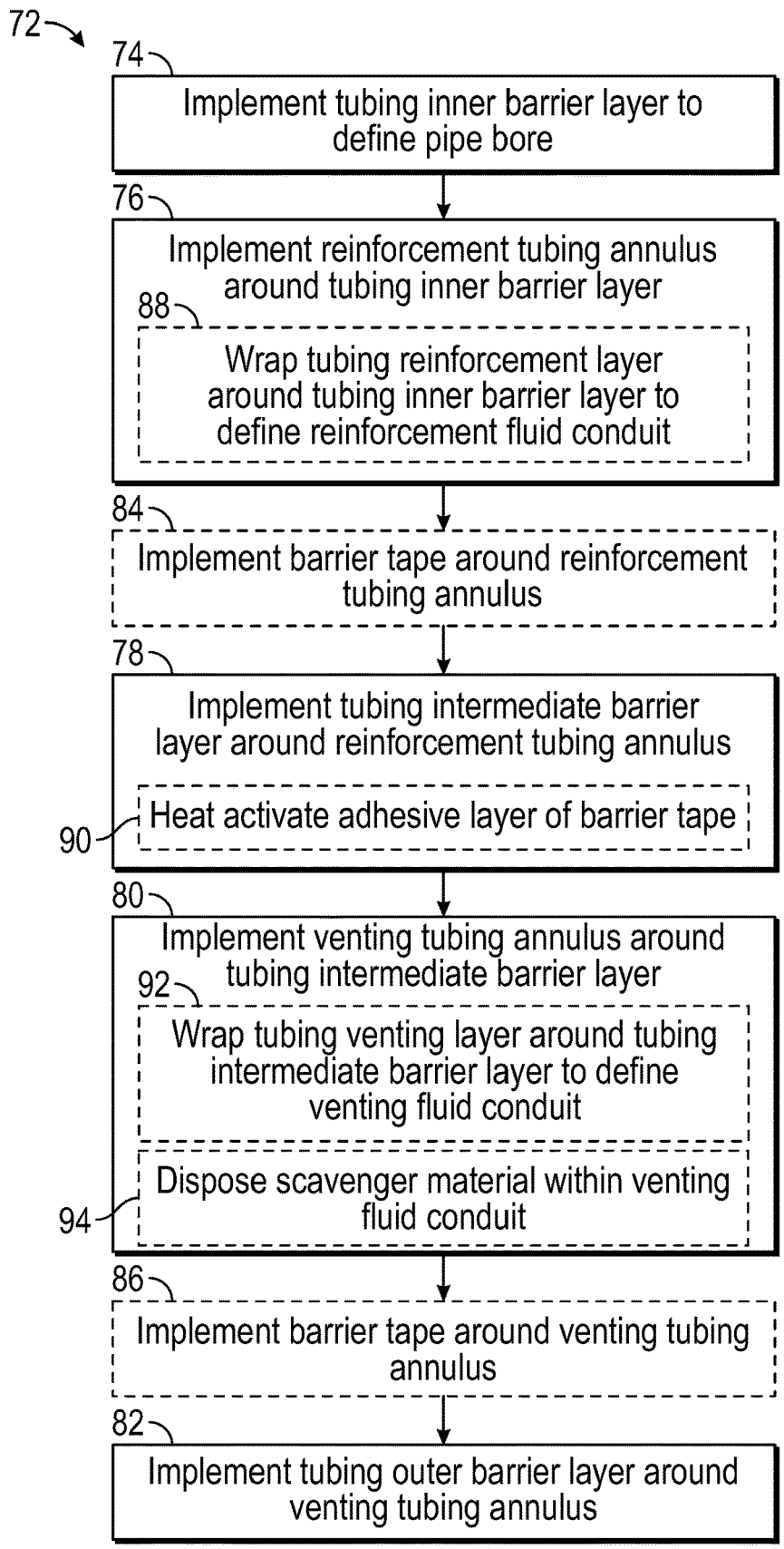
FIG. 10 is a flow diagram of another example of a process for implementing a multiple tubing annuli pipe segment, in accordance with an embodiment of the present disclosure.

To help further illustrate, another example of a process 72 for implementing a pipe segment 20 with multiple tubing annuli 25 is described in FIG. 10. Generally, the process 72 includes implementing a tubing inner barrier layer to define a pipe bore (process block 74) and implementing a reinforcement tubing annulus around the tubing inner barrier layer (process block 76). Additionally, the process 72 includes implementing a tubing intermediate barrier layer around the reinforcement tubing annulus (process block 78), implementing a venting tubing annulus around the tubing intermediate barrier layer (process block 80), and implementing a tubing outer barrier layer around the venting tubing annulus (process block 82).

Although described in a specific order, which corresponds with an embodiment of the present disclosure, it should be appreciated that the example process 72 is merely intended to be illustrative and not limiting. In particular, in other embodiments, a process 72 for implementing a pipe segment 20 with multiple tubing annuli 25 may include one or more additional process blocks and/or omit one or more of the depicted process blocks. For example, some embodiments of the process 72 may additionally include implementing barrier tape around the reinforcement tubing annulus (process block 84) while other embodiments of the process 72 do not. Additionally or alternatively, some embodiments of the process 72 may additionally include implementing barrier tape around the venting tubing annulus (process block 86) while other embodiments of the process 48 do not.

In any case, as described above, the tubing 22 of a pipe segment 20 may include an inner barrier layer 26, which is implemented to define a pipe bore 32 through the pipe segment 20. As such, implementing the pipe segment 20 may include implementing an inner barrier layer 26 to define a pipe bore 32 through the pipe segment 20 (process block 74). In particular, as described above, in some embodiments, the inner barrier layer 26 of pipe segment tubing 22 may be implemented using composite material and/or plastic, such as high-density polyethylene (HDPE) and/or raised temperature polyethylene (PE-RT). Additionally, in some embodiments, the inner barrier layer 26 may be implemented at least in part by extruding the inner barrier layer 26.

As described above, the tubing 22 of a pipe segment 20 may additionally include a reinforcement tubing annulus 25A, which is implemented around an inner barrier layer 26 of the pipe segment 20. As such, implementing the pipe segment 20 may include implementing a reinforcement tubing annulus 25A around the inner barrier layer 26 of the pipe segment 20 (process block 76). In particular, as described above, the reinforcement tubing annulus 25A may include one or more reinforcement layers 36 that are each implemented using a solid material that has a higher tensile strength and/or a higher linear elasticity modulus (e.g., stiffness) as compared to the solid material used to implement the inner barrier layer 26, an intermediate barrier layer 38 of the pipe segment 20, and/or an outer barrier layer 28 of the pipe segment 20. For example, a barrier layer (e.g., inner barrier layer 26, intermediate barrier layer 38, or outer barrier layer 28) of the pipe segment 20 may be implemented using plastic, such as high-density polyethylene (HDPE), while a reinforcement layer 36 of the pipe segment is implemented using metal, such as steel.

Additionally, as described above, in some embodiments, a reinforcement layer 36 included in a reinforcement tubing annulus 25A of a pipe segment 20 may be implemented to enable the reinforcement layer 36 to be wrapped on an inner barrier layer 26 of the pipe segment 20 such that the reinforcement layer 36 facilitates defining a reinforcement fluid conduit 24A. In other words, in such embodiments, implementing the reinforcement tubing annulus 25A may include wrapping a reinforcement layer 36 around the inner barrier layer 26 of the pipe segment 20 to facilitate defining a reinforcement fluid conduit 24A (process block 88). For example, the reinforcement layer 36 may be helically wrapped on the inner barrier layer 26 to facilitate defining a helically-shaped reinforcement fluid conduit 24A.

Furthermore, as described above, the tubing 22 of a pipe segment 20 may include an intermediate barrier layer 38, which is implemented around its reinforcement tubing annulus 25A. As such, implementing the pipe segment 20 may include implementing an intermediate barrier layer 38 around its reinforcement tubing annulus 25A (process block 78). In particular, as described above, in some embodiments, the intermediate barrier layer 38 of the pipe segment 20 may be implemented using a solid material that is more resistant to fluid permeation than the solid material used to implement the inner barrier layer 40 of the pipe segment 20.

However, as described above, in some embodiments, the tubing 22 of a pipe segment 20 may include barrier tape 42 implemented between its reinforcement tubing annulus 25A and its intermediate barrier layer 38. In other words, in such embodiments, implementing the pipe segment 20 may include implementing barrier tape 42 around its reinforcement tubing annulus 25A, for example, before the intermediate barrier layer 38 is implemented (process block 84). That is, in such embodiments, implementing the barrier tape 42 may include implementing the barrier tape 42 around a reinforcement layer 36 included in the reinforcement tubing annulus 25A.

In any case, as described above, barrier tape 42 implemented in pipe segment tubing 22 may generally include an adhesive layer 44 and a barrier layer 46. In particular, as described above, in some embodiments, the barrier tape 42 may be implemented in the pipe segment 20 using a first orientation in which its adhesive layer 44 is oriented inwardly (e.g., facing reinforcement tubing annulus 25A) and its barrier layer 46 is oriented outwardly (e.g., facing intermediate barrier layer 38). However, as described above, in other embodiments, the barrier tape 42 may be implemented in the pipe segment 20 using a second (e.g., different and/or opposite) orientation in which its barrier layer 46 is oriented inwardly (e.g., facing reinforcement tubing annulus 25A) and its adhesive layer 44 is oriented outwardly (e.g., facing intermediate barrier layer 38).

Furthermore, as described above, in some embodiments, the adhesive layer 44 of barrier tape 42 may be heat activated. Moreover, as described above, in some embodiments, the intermediate barrier layer 38 of a pipe segment 20 may be implemented at least in part by extruding the intermediate barrier layer 38. In fact, in some such embodiments, implementing the intermediate barrier layer 38 at least in part by extruding the intermediate barrier layer 38 may also heat activate the adhesive layer 44 of the barrier tape 42, which, at least in some instances, may facilitate reducing implementation associated cost of the pipe segment 20, for example, at least in part by obviating a separate heating process to activate the adhesive layer 44 of the barrier tape 42 (process block 90).

Moreover, to facilitate venting fluid (e.g., potentially corrosive fluid and/or potentially contaminating fluid) that permeates through its outer barrier layer 28 before the fluid reaches its reinforcement tubing annulus 25B and/or its pipe bore 32, as described above, the tubing 22 of a pipe segment 20 may include a venting tubing annulus 25B implemented between its reinforcement tubing annulus 25A and its outer barrier layer 28. In other words, the venting tubing annulus 25B may be implemented around the intermediate barrier layer 38 of the pipe segment 20, which is implemented around the reinforcement tubing annulus 25A. As such, implementing the pipe segment 20 may include implementing a venting tubing annulus 25B around the intermediate barrier layer 38 of the pipe segment 20 (process block 80).

Additionally, as described above, in some embodiments, a venting layer 40 included in a venting tubing annulus 25B of a pipe segment 20 may be implemented to enable the venting layer 40 to be wrapped on an intermediate barrier layer 38 of the pipe segment 20 such that the venting layer 40 facilitates defining a venting fluid conduit 24B. In other words, in such embodiments, implementing the venting tubing annulus 25B may include wrapping a venting layer 40 around the intermediate barrier layer 38 of the pipe segment 20 to facilitate defining a venting fluid conduit 24B (process block 92). For example, the venting layer 40 may be helically wrapped on the intermediate barrier layer 38 to facilitate defining a helically-shaped venting fluid conduit 24B. As described above, the venting fluid conduit 24B may facilitate venting fluid (e.g., potentially corrosive fluid and/or potentially contaminating fluid) that permeates through the outer barrier layer 28 out from the pipe segment 20 before the fluid permeates into a reinforcement tubing annulus 25A of the pipe segment 20, which is implemented internal to the venting tubing annulus 25B and/or into a pipe bore 32 of the pipe segment 20, for example, at least in part by routing the fluid to a vent port on a pipe fitting 18 that is fluidly coupled to the venting tubing annulus 25B of the pipe segment 20.

To facilitate further reducing the likelihood of potentially corrosive fluid permeating into its reinforcement tubing annulus 25A, in some embodiments, a pipe segment 20 may additionally include scavenger material disposed within a venting fluid conduit 24B defined in its venting tubing annulus 25B. In other words, in such embodiments, implementing the venting tubing annulus 25B may include disposing scavenger material within one or more venting fluid conduits 24B defined in the venting tubing annulus 25B of the pipe segment 20 (process block 94). For example, to facilitate reducing the likelihood of hydrogen sulfide ($H_2S$) permeating into the reinforcement tubing annulus 25A, the pipe segment 20 may include a scavenger material that consumes hydrogen sulfide in one or more of its venting fluid conduits 24B. Additionally or alternatively, to facilitate reducing the likelihood of carbon dioxide ($CO_2$) permeating into the reinforcement tubing annulus 25A, the pipe segment 20 may include a scavenger material that consumes carbon dioxide in one or more of its venting fluid conduits 24B.

Furthermore, as described above, the tubing 22 of a pipe segment 20 may include an outer barrier layer 28, which is implemented around its venting tubing annulus 25B. As such, implementing the pipe segment 20 may include implementing an outer barrier layer 28 around the venting tubing annulus 25B of the pipe segment 20 (process block 82). In particular, as described above, in some embodiments, the outer barrier layer 28 of pipe segment tubing 22 may be implemented using composite material and/or plastic, such as high-density polyethylene (HDPE) and/or raised temperature polyethylene (PE-RT).

However, as described above, in some embodiments, the tubing 22 of a pipe segment 20 may include barrier tape 42 implemented between its venting tubing annulus 25B and its outer barrier layer 28. In other words, in such embodiments, implementing the pipe segment 20 may include implementing barrier tape 42 around its venting tubing annulus 25B, for example, before the outer barrier layer 28 is implemented (process block 86). That is, in such embodiments, implementing the barrier tape 42 may include implementing the barrier tape 42 around a venting layer 40 included in the venting tubing annulus 25B.

In any case, as described above, barrier tape 42 implemented in pipe segment tubing 22 may generally include an adhesive layer 44 and a barrier layer 46. In particular, as described above, in some embodiments, the barrier tape 42 may be implemented in the pipe segment 20 using a first orientation in which its adhesive layer 44 is oriented inwardly (e.g., facing venting tubing annulus 25B) and its barrier layer 46 is oriented outwardly (e.g., facing outer barrier layer 28). However, as described above, in other embodiments, the barrier tape 42 may be implemented in the pipe segment 20 using a second (e.g., different and/or opposite) orientation in which its barrier layer 46 is oriented inwardly (e.g., facing venting tubing annulus 25B) and its adhesive layer 44 is oriented outwardly (e.g., facing outer barrier layer 28).

Furthermore, as described above, in some embodiments, the adhesive layer 44 of barrier tape 42 may be heat activated. Moreover, in some embodiments, the outer barrier layer 28 of a pipe segment 20 may be implemented at least in part by extruding the outer barrier layer 28. In fact, in some such embodiments, implementing the outer barrier layer 28 at least in part by extruding the outer barrier layer 28 may also heat activate the adhesive layer 44 of the barrier tape 42, which, at least in some instances, may facilitate reducing implementation associated cost of the pipe segment 20, for example, at least in part by obviating a separate heating process to activate the adhesive layer 44 of the barrier tape 42. In this manner, the present disclosure provides techniques for implementing a pipe segment with multiple tubing annuli, which, at least in some instances, may facilitate improving tensile strength and/or hoop strength of the pipe segment, for example, at least in part by enabling the pipe segment to vent fluid (e.g., potentially corrosive fluid and/or potentially contaminating fluid) that permeates through an outer barrier layer of the pipe segment before it reaches the solid material used to implement a reinforcement layer in the pipe segment.

However, as described above, in some instances, fluid may permeate through an inner barrier layer 26 of the tubing 22 of a pipe segment 20 as well as an outer barrier layer of the pipe segment tubing 22. Thus, in some embodiments, the tubing of the pipe segment may be implemented with multiple venting tubing annuli 25B. For example, the tubing 22 of the pipe segment 20 may include a venting tubing annulus 25B implemented between its inner barrier layer 26 and its reinforcement tubing annulus 25A as well as another venting tubing annulus 25B implemented between its reinforcement tubing annulus 25A and its outer barrier layer 28.

Figure 11:
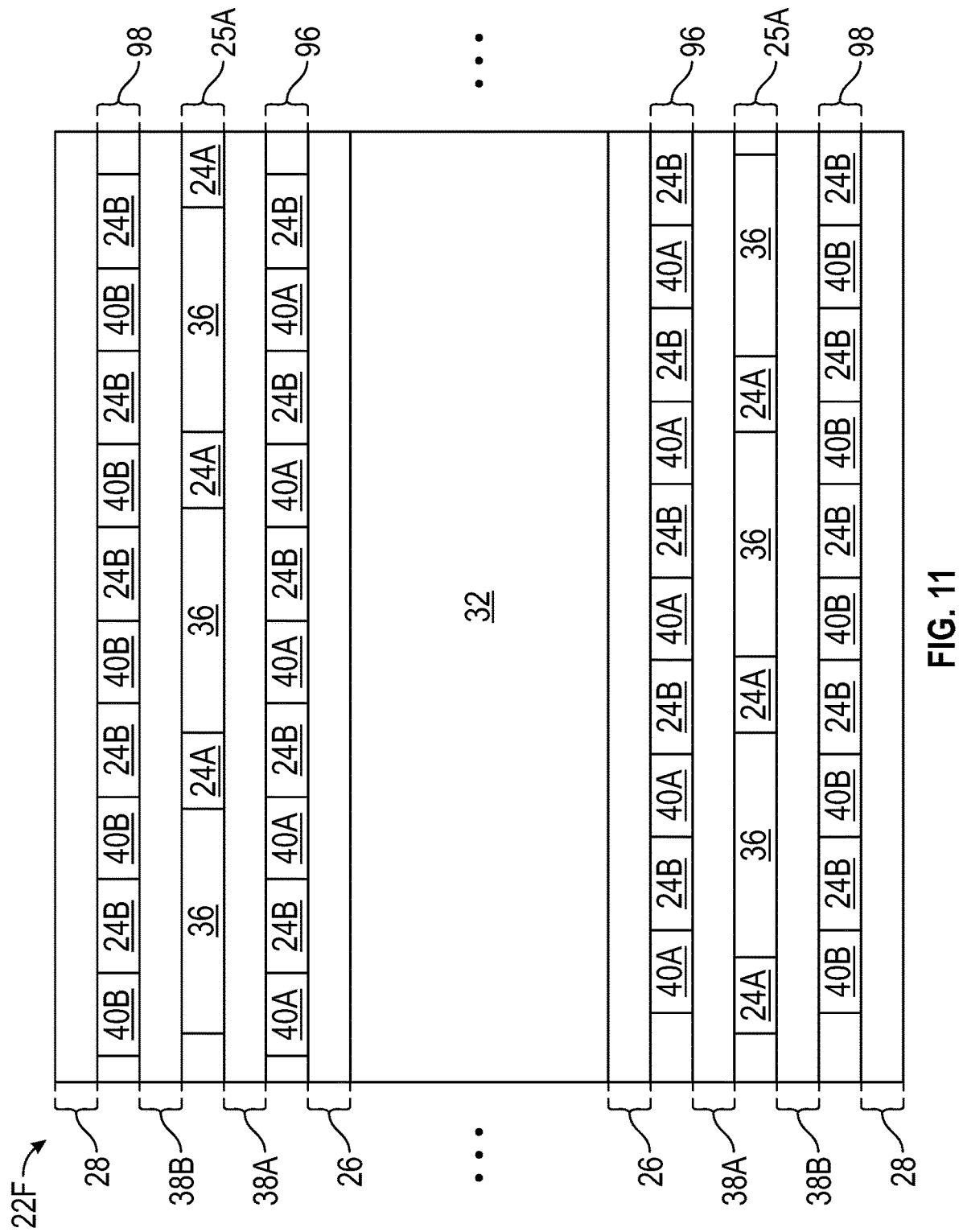
FIG. 11 is an axial cross-section profile of another example of a pipe segment that includes multiple (e.g., three) tubing annuli, in accordance with an embodiment of the present disclosure.

To help illustrate, another example of pipe segment tubing 22F, which includes a reinforcement tubing annulus 25A and multiple venting tubing annuli 25B—namely an inner venting tubing annulus 96 and an outer venting tubing annulus 98, is shown in FIG. 11. As depicted, the pipe segment tubing 22F additionally includes an inner barrier layer 26 that defines a pipe bore 32, an outer barrier layer 28, and multiple intermediate barrier layers 38—namely an inner intermediate barrier layer 38A and an outer intermediate barrier layer 38B. In some embodiments, the inner barrier layer 26 of FIG. 11 may generally match the inner barrier layer 26 of FIG. 5. In fact, in some such embodiments, the inner barrier layer 26 of the pipe segment tubing 22F may be implemented in accordance with process block 50 of FIG. 8.

Additionally, as depicted in FIG. 11, the inner venting tubing annulus 96 of the pipe segment tubing 22F is implemented around the inner barrier layer 26. In particular, as depicted, the inner venting tubing annulus 96 includes an inner venting layer 40A that is implemented to define a venting fluid conduit 24B, for example, which may be fluidly coupled to a vent port on a pipe fitting 18. As such, in some embodiments, the inner venting tubing annulus 96 of FIG. 11 may generally match the venting tubing annulus 25B of FIG. 5. In fact, in some such embodiments, the inner venting tubing annulus 96 of the pipe segment tubing 22F may be implemented in accordance with process block 52 of FIG. 8.

Furthermore, as depicted in FIG. 11, the inner intermediate barrier layer 38A of the pipe segment tubing 22F is implemented around the inner venting tubing annulus 96. As such, in some embodiments, the inner intermediate barrier layer 38A of FIG. 11 may generally match the intermediate barrier layer 38 of FIG. 5. In fact, in some such embodiments, the inner intermediate barrier layer 38A of the pipe segment tubing 22F may be implemented in accordance with process block 54 of FIG. 8.

Moreover, as depicted in FIG. 11, the reinforcement tubing annulus 25A of the pipe segment tubing 22B is implemented around the inner intermediate barrier layer 38A. In particular, as depicted, the reinforcement tubing annulus 25A includes a reinforcement layer 36 that is implemented to define a reinforcement fluid conduit 24A. As such, in some embodiments, the reinforcement tubing annulus 25A of FIG. 11 may generally match the reinforcement tubing annulus 25A of FIG. 5. In fact, in some such embodiments, the reinforcement tubing annulus 25A of the pipe segment tubing 22F may be implemented in accordance with process block 56 of FIG. 8.

Additionally, as depicted in FIG. 11, the outer intermediate barrier layer 38B of the pipe segment tubing 22F is implemented around the reinforcement tubing annulus 25A. As such, in some embodiments, the outer intermediate barrier layer 38B of FIG. 11 may generally match the intermediate barrier layer 38 of FIG. 9. In fact, in some such embodiments, the outer intermediate barrier layer 38B of the pipe segment tubing 22F may be implemented in accordance with process block 78 of FIG. 10.

Furthermore, as depicted in FIG. 11, the outer venting tubing annulus 98 of the pipe segment tubing 22F is implemented around the outer intermediate barrier layer 38B. In particular, as depicted, the outer venting tubing annulus 98 includes an outer venting layer 40B that is implemented to define a venting fluid conduit 24B, for example, which may be fluidly coupled to a vent port on a pipe fitting 18. As such, in some embodiments, the outer venting tubing annulus 98 of FIG. 11 may generally match the venting tubing annulus 25B of FIG. 9. In fact, in some such embodiments, the outer venting tubing annulus 98 of the pipe segment tubing 22F may be implemented in accordance with process block 80 of FIG. 10.

Moreover, as depicted in FIG. 11, the outer barrier layer 28 of the pipe segment tubing 22F is implemented around the outer venting tubing annulus 98. As such, in some embodiments, the outer barrier layer 28 of FIG. 11 may generally match the outer barrier layer 28 of FIG. 9. In fact, in some such embodiments, the outer barrier layer 28 of the pipe segment tubing 22F may be implemented in accordance with process block 82 of FIG. 10. In this manner, the present disclosure provides techniques for implementing a pipe segment with multiple tubing annuli, which, at least in some instances, may facilitate improving tensile strength of the pipe segment, hoop strength of the pipe segment, and/or fluid isolation provided by the pipe segment, for example, at least in part by enabling the pipe segment to vent fluid that permeates through an outer barrier layer or an inner barrier layer of the pipe segment before it reaches the solid material used to implement a reinforcement layer in the pipe segment.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed is:

1. A pipe segment comprising:
a tubing inner barrier layer that defines a pipe bore through the pipe segment;
a venting tubing annulus implemented around the tubing inner barrier layer, wherein the venting tubing annulus comprises a first solid material implemented to define a venting fluid conduit;
a tubing intermediate barrier layer implemented around the venting tubing annulus;
a reinforcement tubing annulus implemented around the tubing intermediate barrier layer, wherein:
the reinforcement tubing annulus comprises a second solid material that is different from the first solid material and is implemented to define a reinforcement fluid conduit; and
the venting fluid conduit implemented in the venting tubing annulus is configured to facilitate venting fluid that permeates from the pipe bore through the tubing inner barrier layer out from the pipe segment before the fluid contacts the second solid material in the reinforcement tubing annulus;
a tubing outer barrier layer implemented around the reinforcement tubing annulus of the pipe segment; and
barrier tape implemented between the venting tubing annulus and the intermediate barrier layer of the pipe segment, wherein the barrier tape comprises:
an adhesive layer oriented outwardly; and
a barrier layer oriented inwardly.

2. The pipe segment of claim 1, wherein:
the tubing inner barrier layer, the tubing intermediate barrier layer, and the tubing outer barrier layer each comprise a continuous layer of solid material;
the venting tubing annulus comprises a first layer of the first solid material that is helically wrapped on the tubing inner barrier layer of the pipe segment; and
the reinforcement tubing annulus comprises a second layer of the second solid material that is helically wrapped on the tubing intermediate barrier layer of the pipe segment.

3. The pipe segment of claim 1, wherein:
the venting fluid conduit implemented in the venting tubing annulus of the pipe segment comprises a first helically-shaped fluid conduit; and
the reinforcement fluid conduit implemented in the reinforcement tubing annulus of the pipe segment comprises a second helically-shaped fluid conduit.

4. The pipe segment of claim 1, wherein:
the first solid material in the venting tubing annulus of the pipe segment comprises a polymer, aluminum, or both; and
the second solid material in the reinforcement tubing annulus of the pipe segment comprises steel.

5. The pipe segment of claim 1, wherein:
the first solid material in the venting tubing annulus of the pipe segment is less susceptible to corrosion by the fluid that permeates from the pipe bore through the tubing inner barrier layer as compared to the second solid material in the reinforcement tubing annulus of the pipe segment; and the second solid material in the reinforcement tubing annulus of the pipe segment has a higher tensile strength and a higher linear elasticity modulus as compared to the first solid material in the venting tubing annulus of the pipe segment.

6. The pipe segment of claim 1, comprising scavenger material disposed in the venting fluid conduit of the venting tubing annulus, wherein the scavenger material is configured to consume at least a portion of the fluid that permeates from the pipe bore through the tubing inner barrier layer.

7. A method of implementing tubing of a pipe segment, comprising:
   implementing an inner barrier layer of the tubing to define a pipe bore through the pipe segment;
   implementing a venting tubing annulus around the inner barrier layer at least in part by implementing a venting layer of the tubing using a first solid material to facilitate defining a venting fluid conduit that facilitates venting fluid that permeates through the inner barrier layer of the tubing out from the tubing of the pipe segment;
   disposing scavenger material in the venting fluid conduit to facilitate consuming at least a portion of the fluid that permeates through the inner barrier layer of the tubing of the pipe segment;
   implementing an intermediate barrier layer of the tubing around the venting tubing annulus;
   implementing a reinforcement tubing annulus around the intermediate barrier layer of the tubing at least in part by implementing a reinforcement layer of the tubing using a second solid material that is different from the first solid material to facilitate defining a reinforcement fluid conduit within the tubing of the pipe segment; and
   implementing an outer barrier layer of the tubing around the reinforcement tubing annulus.

8. The method of claim 7, comprising implementing barrier tape around the venting tubing annulus, wherein implementing the intermediate barrier layer of the tubing comprises implementing the intermediate barrier layer around the barrier tape.

9. The method of claim 8, comprising implementing another barrier tape around the reinforcement tubing annulus, wherein implementing the outer barrier layer of the tubing comprises implementing the outer barrier layer around the other barrier tape.

10. The method of claim 8, wherein implementing the barrier tape around the venting tubing annulus comprises orienting a barrier layer of the barrier tape toward the venting tubing annulus and orienting an adhesive layer of the barrier tape toward environmental conditions external to the pipe segment.

11. The method of claim 7, wherein:
   implementing the venting layer of the tubing using the first solid material comprises implementing the venting layer of the tubing using a polymer, aluminum, or both; and
   implementing the reinforcement layer of the tubing using the second solid material comprises implementing the reinforcement layer of the tubing using steel.

12. The method of claim 7, wherein:
   implementing the venting layer of the tubing comprises helically wrapping the first solid material on the inner barrier layer of the tubing to facilitate defining a helically-shaped venting fluid conduit within the tubing of the pipe segment; and
   implementing the reinforcement layer of the tubing comprises helically wrapping the second solid material on the intermediate barrier layer of the tubing to facilitate defining a helically-shaped reinforcement fluid conduit within the tubing of the pipe segment.

13. Pipe segment tubing comprising:
   an inner barrier layer configured to define a pipe bore, wherein the inner barrier layer is implemented using high-density polyethylene;
   an outer barrier layer implemented around the inner barrier layer of the pipe segment tubing, wherein the outer barrier layer is implemented using high-density polyethylene;
   a reinforcement layer implemented between the inner barrier layer and the outer barrier layer of the pipe segment tubing, wherein the reinforcement layer is configured to define a reinforcement fluid conduit and is implemented using steel;
   a venting layer implemented between the inner barrier layer and the outer barrier layer of the pipe segment tubing, wherein the venting layer is configured to define a venting fluid conduit that facilitates venting fluid that permeates into the pipe segment tubing out from the pipe segment tubing before the fluid contacts solid material in the reinforcement layer of the pipe segment tubing and is implemented using aluminum; and
   an intermediate barrier layer implemented between the reinforcement layer and the venting layer of the pipe segment tubing, wherein the intermediate barrier layer is implemented with a solid material that has slower fluid permeation than high-density polyethylene.

14. The pipe segment tubing of claim 13, wherein:
   the venting layer is helically wrapped on the inner barrier layer of the pipe segment tubing to facilitate defining the venting fluid conduit with a helical shape; and
   the reinforcement layer is helically wrapped on the intermediate barrier layer of the pipe segment tubing to facilitate defining the reinforcement fluid conduit with a helical shape.

15. The pipe segment tubing of claim 13, wherein:
   the venting layer of the pipe segment tubing is implemented directly on the inner barrier layer of the pipe segment tubing;
   the intermediate barrier layer of the pipe segment tubing is implemented around a venting tubing annulus of the pipe segment tubing that comprises the venting layer; and
   the reinforcement layer of the pipe segment tubing is implemented directly on the intermediate barrier layer of the pipe segment tubing.

16. The pipe segment tubing of claim 13, wherein:
   the reinforcement layer of the pipe segment tubing is implemented directly on the inner barrier layer of the pipe segment tubing;
   the intermediate barrier layer of the pipe segment tubing is implemented around a reinforcement tubing annulus of the pipe segment tubing that comprises the reinforcement layer; and
   the venting layer of the pipe segment tubing is implemented directly on the intermediate barrier layer of the pipe segment tubing.

* * * * *